US009854785B2

(12) United States Patent
Fallis et al.

(10) Patent No.: US 9,854,785 B2
(45) Date of Patent: Jan. 2, 2018

(54) SOW FEEDING SYSTEM

(71) Applicant: Canarm Ltd., Brockville (CA)

(72) Inventors: Paul Fallis, Atwood (CA); Douglas Matthews, Brockville (CA); Wayne Mick, Moorefield (CA); George Yan, Toronto (CA)

(73) Assignee: Canarm Ltd., Brockville, Ontario (CA)

( * ) Notice: Subject to any disclaimer, the term of this patent is extended or adjusted under 35 U.S.C. 154(b) by 8 days.

(21) Appl. No.: 14/561,698

(22) Filed: Dec. 5, 2014

(65) Prior Publication Data
US 2015/0237825 A1    Aug. 27, 2015

Related U.S. Application Data

(60) Provisional application No. 61/912,326, filed on Dec. 5, 2013.

(51) Int. Cl.
*A01K 5/02* (2006.01)
*A01K 1/02* (2006.01)

(52) U.S. Cl.
CPC .......... *A01K 5/0225* (2013.01); *A01K 1/0209* (2013.01); *A01K 5/0275* (2013.01)

(58) Field of Classification Search
CPC .. A01K 1/0017; A01K 1/0023; A01K 1/0209; A01K 1/10; A01K 1/105;
(Continued)

(56) References Cited

U.S. PATENT DOCUMENTS 2,791,984 A * 5/1957 Franklin .............. A01K 5/0291
  119/51.12
3,792,686 A * 2/1974 Needham ................. A01K 1/12
  119/14.03
(Continued)

FOREIGN PATENT DOCUMENTS

DE     3623816 A1 *  1/1987  ........... A01K 1/0209
EP  EP 0610171 A2 *  8/1994  ........... A01K 1/0209
GB     2179616 A  *  3/1987  ............... A01K 5/02

OTHER PUBLICATIONS

English-language translation of EP 0610171.*
(Continued)

*Primary Examiner* — Lisa L Tsang
(74) *Attorney, Agent, or Firm* — Lorri W. Cooper; Medley, Behrens & Lewis LLC

(57) ABSTRACT

A system for individually feeding sows within a snuggery includes entry, feeder station and exit assemblies. The entry assembly includes an entry gate module for individually admitting a sow therein. The exit assembly includes an exit gate module. The feeder station assembly includes at least one feed dispenser for dispensing a selected amount of feed into a trough and a carrier for supporting said trough. The carrier is displaceable between an extended position wherein the trough is positioned within the snuggery to permit access by a sow and a retracted position wherein the trough is inaccessible to the sow and the trough is positioned for filling by the feed dispenser. Feed may be dispensed in individualized rations to the sow under the control of a computer-driven controller. Movement of the sow within the snuggery may be controlled by sequentially illuminating regions of the snuggery, under the control of the controller.

14 Claims, 22 Drawing Sheets

(58) Field of Classification Search
CPC ........ A01K 5/02; A01K 5/0225; A01K 5/025; A01K 5/0275
USPC ....... 119/449, 502, 515, 516, 518, 521, 524, 119/51.02, 51.11, 51.13, 52.1, 52.3, 52.4, 119/53, 56.1, 56.2, 57.1, 57.4, 57.92, 712, 119/751
See application file for complete search history.

(56) References Cited

U.S. PATENT DOCUMENTS

| | | | | |
|---|---|---|---|---|
| 5,158,041 | A * | 10/1992 | Schmitz | A01K 1/0613 119/751 |
| 5,950,562 | A * | 9/1999 | Schulte | A01K 1/0023 119/51.02 |
| 6,899,044 | B2 * | 5/2005 | Thibault | A01K 1/0017 119/51.02 |
| 7,228,816 | B2 * | 6/2007 | Turner | A01K 5/0114 119/51.02 |
| 8,132,538 | B1 | 3/2012 | Schick et al. | |
| 2003/0192487 | A1 * | 10/2003 | Zimmerman | A01K 29/00 119/842 |
| 2006/0112890 | A1 * | 6/2006 | Den Berg | A01K 5/02 119/51.02 |
| 2007/0186859 | A1 * | 8/2007 | Moreau | A01K 1/0017 119/14.03 |
| 2008/0154568 | A1 * | 6/2008 | Burghardi | A01K 5/02 703/11 |
| 2012/0048206 | A1 * | 3/2012 | Eakin | A01K 29/00 119/515 |
| 2013/0098299 | A1 * | 4/2013 | Adermann | A01K 5/0225 119/53 |
| 2013/0298837 | A1 * | 11/2013 | Weelink | A01K 5/0275 119/51.02 |
| 2015/0040834 | A1 * | 2/2015 | Loos | A01K 1/0209 119/518 |

OTHER PUBLICATIONS

English-language translation of DE 3623816.*
Webpage; http://www.schauer-agrotronic.com/en/pig-equipment/pig-feeding/compident-electronic-sow-feeding/; Description of Compident feeding system; 4 pages.
Webpage; http://www.canarm.com/UserFiles/Documents/Product/ESF%20Literature.pdf; Description of Canarm ESF system; 4 pages.
Webpage; http://www.prweb.com/releases/2014/10/prweb12207982.htm; Article entitled: PigTek Introduces New Mannebeck® Electronic Sow Care System Feeders and Controls, dated Sep. 30, 2014; 3 pages.
Webpage; http://en.nedap-livestockmanagement.com/uploads/Varkens/Varkens%20Prestatie%20Test/Voerstation_EN.pdf; Nedap Electronic Sow Feeding Brochure; 6 pages.

* cited by examiner

SOW FEEDING SYSTEM

CROSS-REFERENCE TO RELATED APPLICATION

This application claims priority to U.S. Provisional Application No. 61/912,326, filed on Dec. 5, 2013, the disclosure of which is incorporated by reference herein in its entirety.

FIELD

The invention relates to animal husbandry and in particular to systems for feeding of sows. The invention has particular application in an open pen facility (loose sow housing/group gestation) where multiple sows are housed in which it is desired to feed sows on an individual basis within a secure, controlled environment with a specific calculated feed ration, determined and delivered in a series of equal portions in an automated process

BACKGROUND

In modern sow husbandry, it is known to house large numbers of sows within a single large pen. Group pens allow the animals to socially interact, displaying natural behaviours. However, difficulties can arise during feeding, in particular with respect to competition between sows at a common feed trough. In response to this problem, feeding modules may be provided that permit individual sows access to feed isolated from other sows. Feeding stations such as the NEDAP™ sow feeding system provide an enclosure for an individual sow having entrance and exit gates controlled by mechanical or pneumatic actuators, a feed trough located within the enclosure and a feed dispenser for dispensing feed into the trough. The feed dispenser may be controlled for dispensing a selected amount of feed to an individual sow identified by an RFID tag or by other means that allow the feed to be dispensed to each sow. The enclosure is more or less fully enclosed to isolate the sow during feeding, while permitting sow to remain in the group pen environment at other times.

Similar to the above are the COMPIDENT™ and MANNEBECK™ electronic sow feeding systems. A sow enclosure for feeding sows within a large pen facility is also described in U.S. Pat. No. 8,132,538 to Schick et al.

Feeding Systems management software such SOW-CHOICE SYSTEMS™ ESF by PIGCHAMP™ allows farmers to tailor the nutritional requirements of sows to their individual requirements, taking into account a variety of factors.

SUMMARY

The present invention relates to improved systems and methods for using an automated process to calculate and dispense feed portions to an individual sow in a secure, non competitive environment in which the sow chooses to separate herself from the group environment for feeding. One or more of the assemblies according to the invention may be placed within a large open pen facility or group housing environment, to allow individual sows to choose to separate themselves in a secure, non competitive environment during feeding, while permitting the remainder of the group of sows to otherwise roam freely in a open pen facility or group housing environment when not feeding. The invention provides a metered feed dispensing system that can be controlled by an electronic controller that may be programmed to dispense feed to a sow on an individual basis, calculating nutritional requirements according to predetermined factors such as the age and weight of the sow, as determined by the farm management. The controller may be operated directly from the CPU located on the farm or remotely via Ethernet or internet which may be connected, for example, by a mobile computing device, PDA or Smartphone. Furthermore, the controller may interface or integrate with swine management software to allow the system to automatically dispense a selected mixture and quantity of feed that has been automatically calculated and tailored to the individual nutritional needs of each individual sow within the herd.

According to one aspect, the invention relates to a system for individually feeding sows. The system comprises an entry assembly, feeder station assembly and an exit assembly sequentially arranged and defining an enclosed snuggery. The entry assembly comprises an entry gate module for individually admitting a sow into the snuggery when open and blocking the entry of sows into the snuggery when closed. The exit assembly comprises an exit gate module for permitting a sow to exit the snuggery when open and blocking the entry of sows into the snuggery when closed. The feeder station assembly comprises at least one feed dispenser for dispensing a selected amount of feed into a trough and a carrier for supporting said trough. The carrier is displaceable between an extended position wherein the trough is positioned within the snuggery to permit access by a sow located within the snuggery and a retracted position wherein the trough is inaccessible to the sow and the trough is positioned for filling by the feed dispenser in either position. The carrier comprises a support member for the trough and an actuator for selectively reciprocating the support member between the extended and retracted positions The assemblies may be aligned in an essentially straight linear pathway, or non-linear.

The metered feed dispenser may comprise a plurality of metered feed dispenser units each being independently controlled for dispensing a selected quantity of feed into said trough wherein each sow may be provided with a predetermined mixture and/or quantity of feed.

The system may further comprise a controller in operative communication with said metered feed dispenser units, comprising data processing and storage components for calculating and storing feed plans for individual sows and for controlling said metered feed dispenser units to dispense a predetermined quantity and feed mixture for an individual sow based on a stored or daily calculated feed plan.

The carrier may comprise a support for supporting the trough, a linkage connecting the support to the assembly for urging the support between the extended and retracted positions and an actuator for rotating the linkage between the extended and retracted positions. The linkage may comprise an arm pivotally mounted to the feeder station module and a post rigidly mounted to the support wherein the arm and post are engaged together by a coupling wherein rotary movement of the arm is translated into horizontal movement of the support. The coupling may comprise a pin extending from the arm and engaged within a slot within the post for travelling within the slot whereby rotational movement of the arm is converted into essentially horizontal movement of the support.

The retracted position of the carrier may position the trough at least substantially outside of the snuggery and the extended position positions the trough essentially within the interior of the snuggery. The extended position of said carrier may prevent the sow from entering the exit module.

The system may further comprise a lighting system under the control of a controller, which sequentially illuminates discrete portions of the system wherein the level of illumination and illumination sequence encourages sows to progressively move through the system.

The feed dispensers may be controlled by a remote computing device comprising components for data processing, data entry, signal transmission to said controller, and a user interface. The controller may comprise an interface for integrating swine management software with said controller for determining said individual feeding plans.

According to another aspect, the invention relate to a system for individually feeding sows within a snuggery, wherein said sows are identified according to an individual feeding plan for a given sow, comprising
- a feeder assembly for dispensing a selected amount of feed comprising a mixture of feed types to a sow located within the snuggery, said feeder assembly comprising a plurality of metered feed dispenser units and at least one outlet for discharging said feed from the plurality of feed dispenser units into a feed trough for feeding a sow within the snuggery, said feed dispenser units each being independently controllable for dispensing a selected amount of feed to provide said feed mixture to the sow; and
- a controller for controlling the operation of said feed dispenser units to control the quantity dispensed by each of said units for an individual feeding episode, wherein the feeder assembly dispenses a predetermined feed quantity and mixture in response to the individual feeding plan of a given one of said sows.

The system may include at least one proximity sensor, wherein location of the sow may be determined by the proximity sensor(s) and said controller actuates said lights to sequentially illuminate an entry area, a feed area and an exit/whiling area of said snuggery in response to the presence of said sow.

The sequential illumination may be under the control of a timer associated with the controller.

According to a further aspect, the invention relates to a method for dispensing feed to a sow within a snuggery, comprising the steps of:
- positioning a feed trough beneath a feed dispenser assembly located outside said snuggery;
- opening an entry gate of said snuggery to permit the sow to enter into said snuggery and closing said gate when the sow is located within the snuggery to isolate the sow within the snuggery, said sow having an identifier tag thereon comprising encoded information identifying said sow wherein said tag generates a signal which identifies said sow;
- reading the identifier tag on said sow and communicating the sow identifier information thereon to a computer;
- determining by said computer an optimal feed mixture and quantity for said sow based upon predetermined criteria;
- communicating the optimal feed mixture and quantity for the sow to said feed dispenser assembly;
- dispensing a feed allotment comprising the optimal feed mixture and/or quantity for the sow as determined in said determining step, from the feed dispenser into the trough;
- conveying the trough into the interior of the snuggery for access by the sow;
- retracting the trough from the interior of the snuggery after the sow has consumed said feed; and
- an exit gate of the snuggery to permit the sow to exit the snuggery.

The optimal feed mixture and quantity may be determined from one or more of the following criteria: sow weight, age, pregnancy state, gestation length, past performance, Body Condition Score, Back fat levels, genetic potential management input, and time of day.

The movement of the sow within the snuggery may be controlled by sequentially illuminating regions of said snuggery, wherein said illumination is controlled by said computer.

The feed dispenser assembly may comprise one or more metered feed dispenser units each being independently controlled for dispensing a selected quantity of feed into said trough. The method may comprising the further steps of recording in said controller one or more of:
- the dispensed feed allotment;
- the duration of the feeding time of said sow; and
- the duration of dwell time of the sow within the snuggery.

The method may comprise the further steps of detecting the presence and location of said sow within said snuggery by at least one proximity sensor, communicating said presence and location information to said controller, and actuating said entry gate, dispensing, conveying and exit gate opening steps in response to said proximity information, under the control of said controller. The entry and exit gates may be actuated by said computer in response to movement of said sow as determined by said identifier tag.

DETAILED DESCRIPTION

Figure 1:
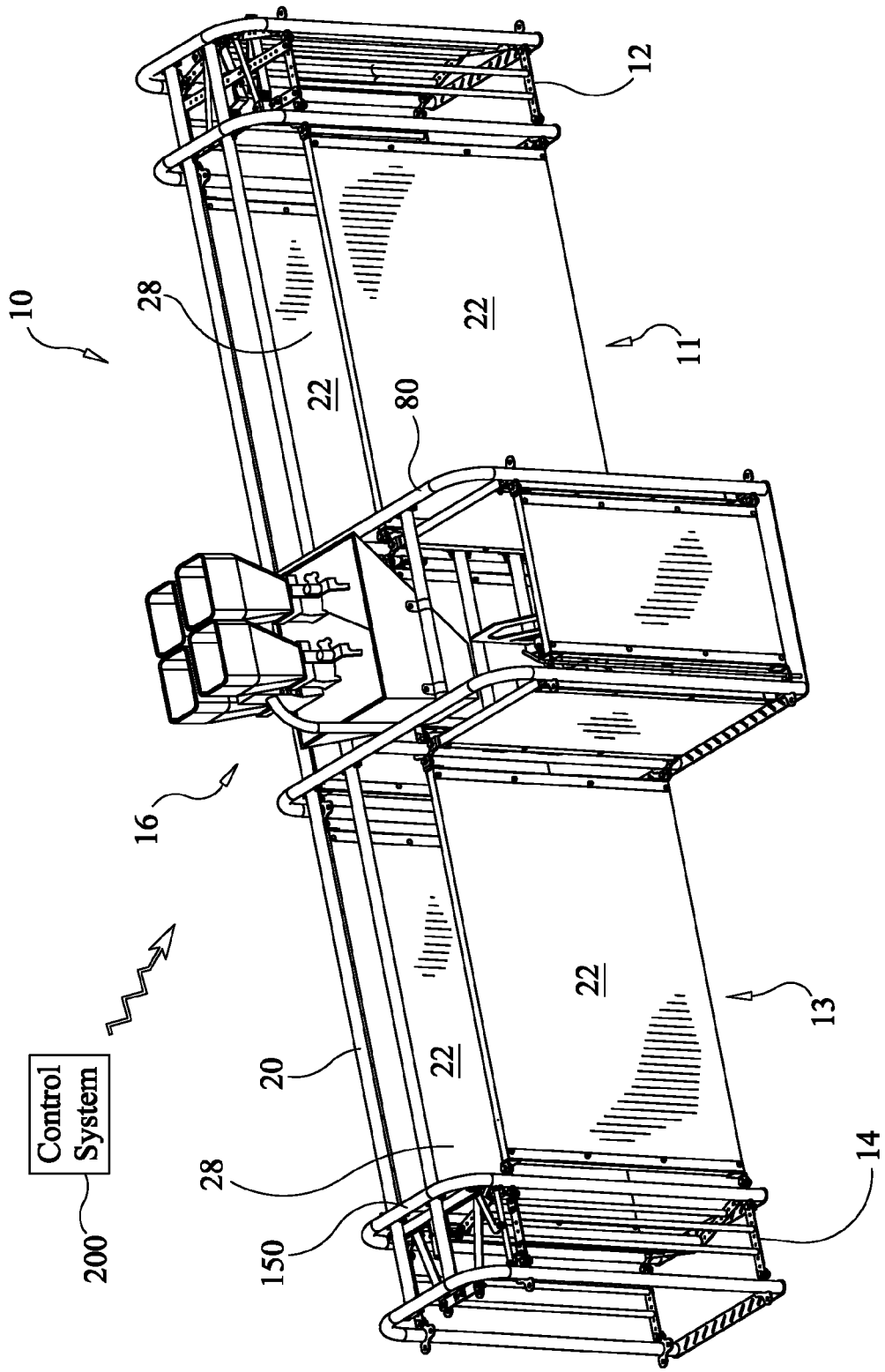
FIG. 1 is a perspective view of an assembly according to one embodiment of the invention.
Figure 2:
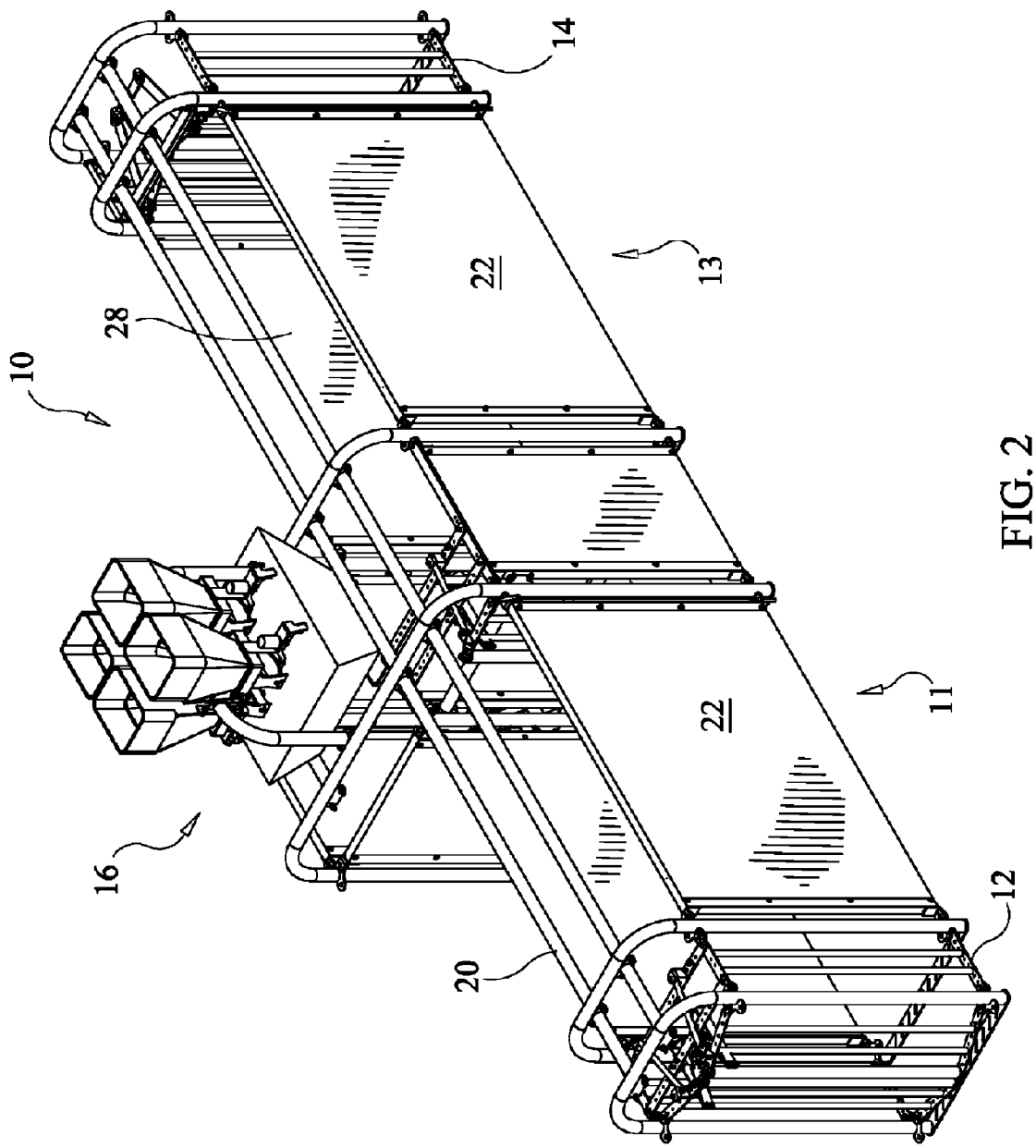
FIG. 2 is a further perspective view showing the side of the assembly opposed to FIG. 1.
Figure 3:
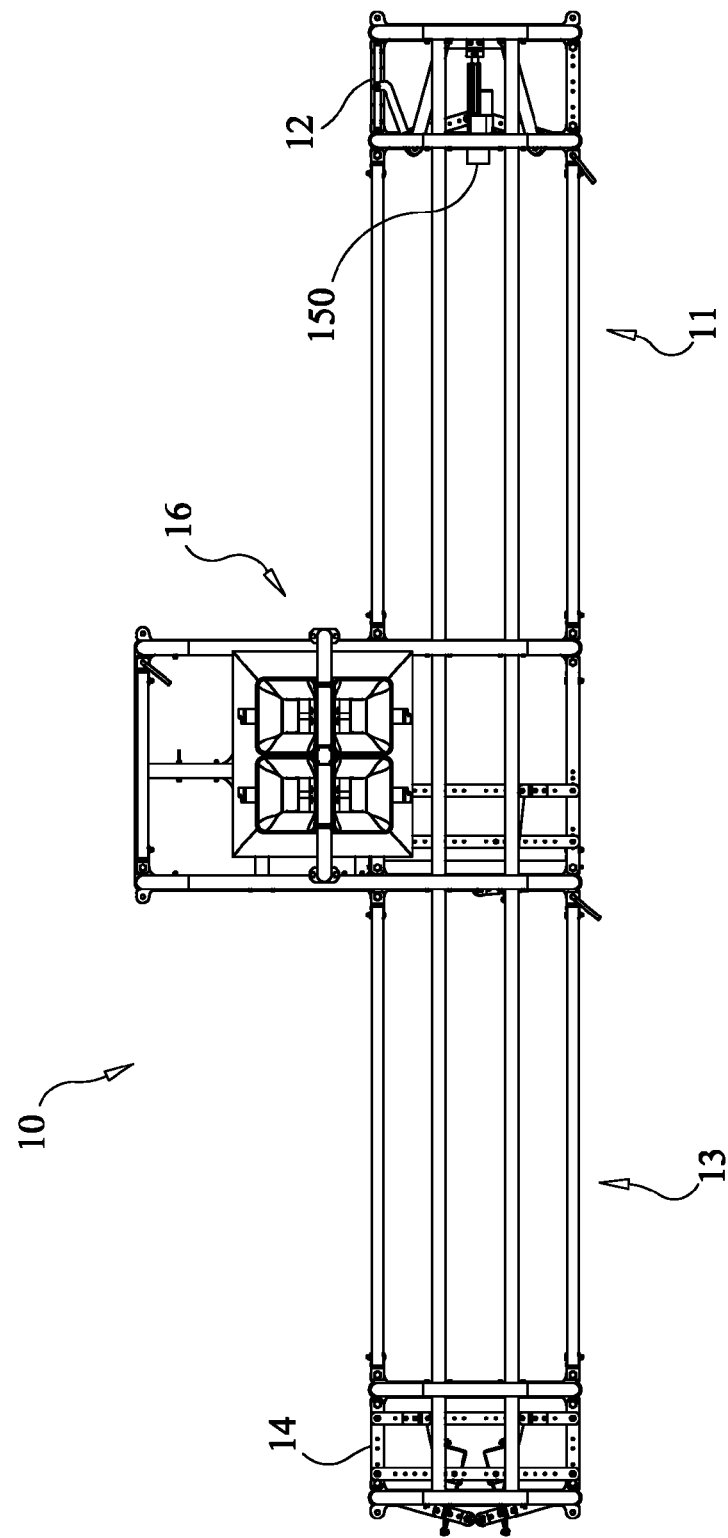
FIG. 3 is a plan view of the assembly, from above.

An embodiment of a single Electronic Sow Feeder (ESF) assembly 10 is shown in the Figures. Assembly 10 comprises a system composed of individual assemblies arranged in a linear sequence which are assembled to form an Electronic Sow Feeder (ESF) assembly for individually feeding sows. First in line in ESF assembly 10 is a sow approach assembly 11. Assembly 11 includes an entry gate module 12 at a first end thereof. Next in line is a feed module 16. Last in line is a whiling assembly 13. An exit gate module 14 is located at an end of whiling area 13, directly opposed to entry gate module 12. The respective assemblies form an enclosed, elongate snuggery for a sow. The different modules of a single Electronic Sow Feeder (ESF) assembly 10 share common components where possible. Precision Feed module 16 extends partially within Electronic Sow Feeder (ESF) assembly 10 and protrudes outwardly therefrom. A single Electronic Sow Feeder (ESF) assembly 10, is composed of a rigid open frame 20 comprised of tubular metal members such as stainless steel or galvanized steel. Rigid side panels 22 are secured to frame 20 on opposing sides of frame 20 to form an elongate rectangular, channel-like enclosure. A single Electronic Sow Feeder (ESF) assembly 10 thus consists of an essentially linear channel defined by a linear axis between the entry gate module 12 and exit gate module 14 with tailored vertical side panels 22 for defining the secure non competitive feeding environment for sows within the Electronic Sow Feeder assembly 10

Figure 16A:
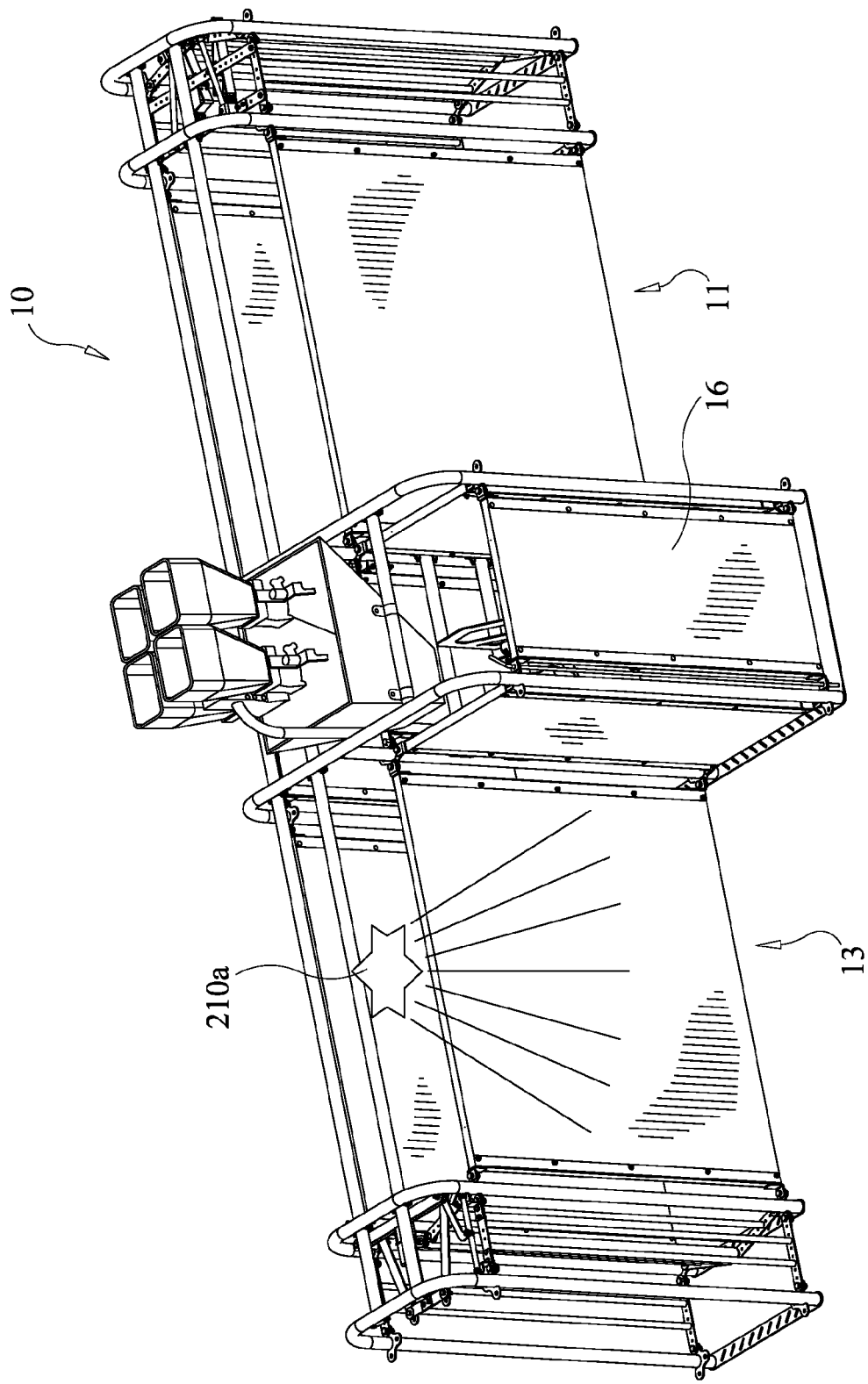
FIGS. 16A, 16B and 16C are perspective views showing the illumination system incorporated into one embodiment of the present system.
Figure 16B:
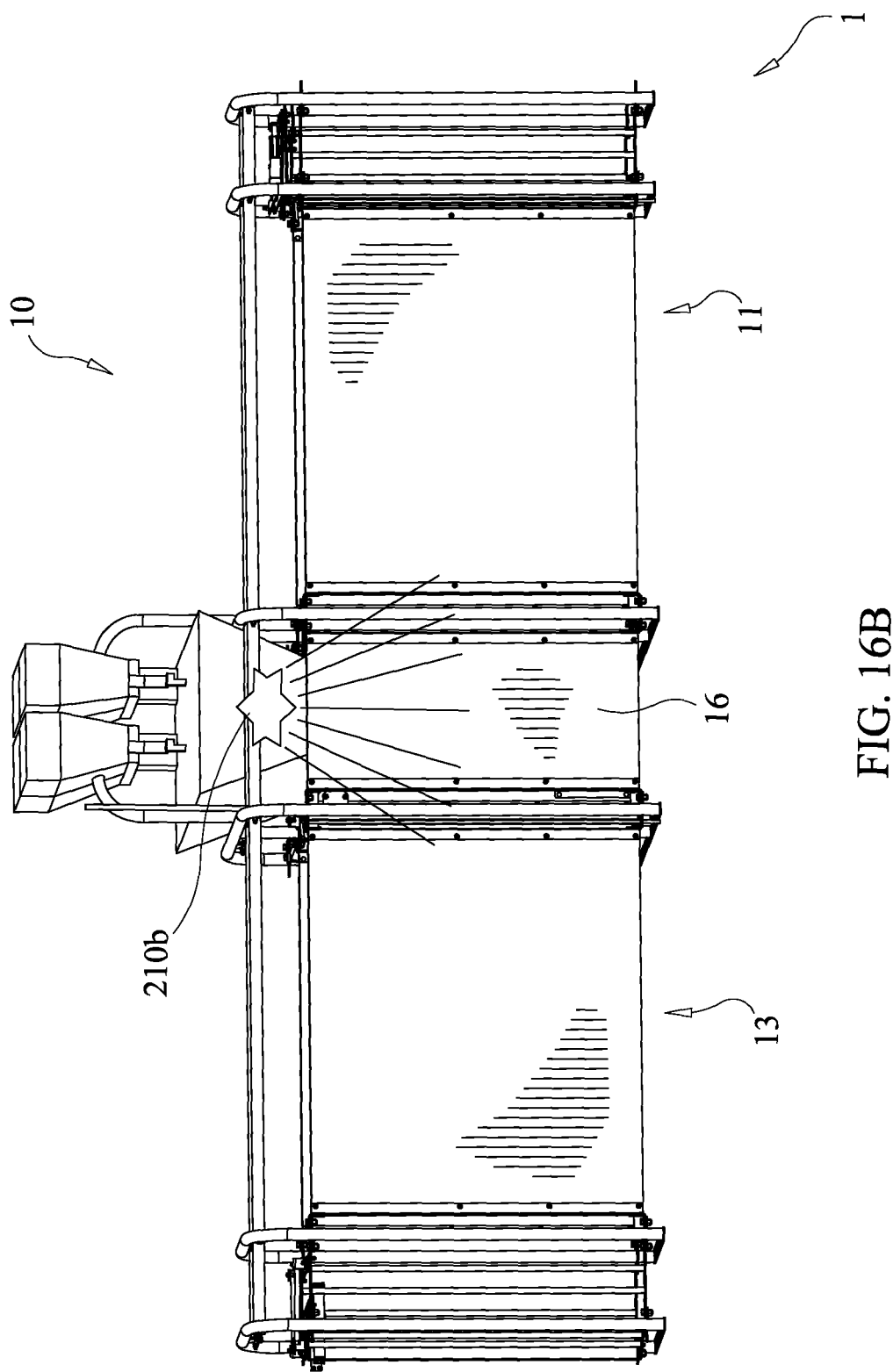
Figure 16C:
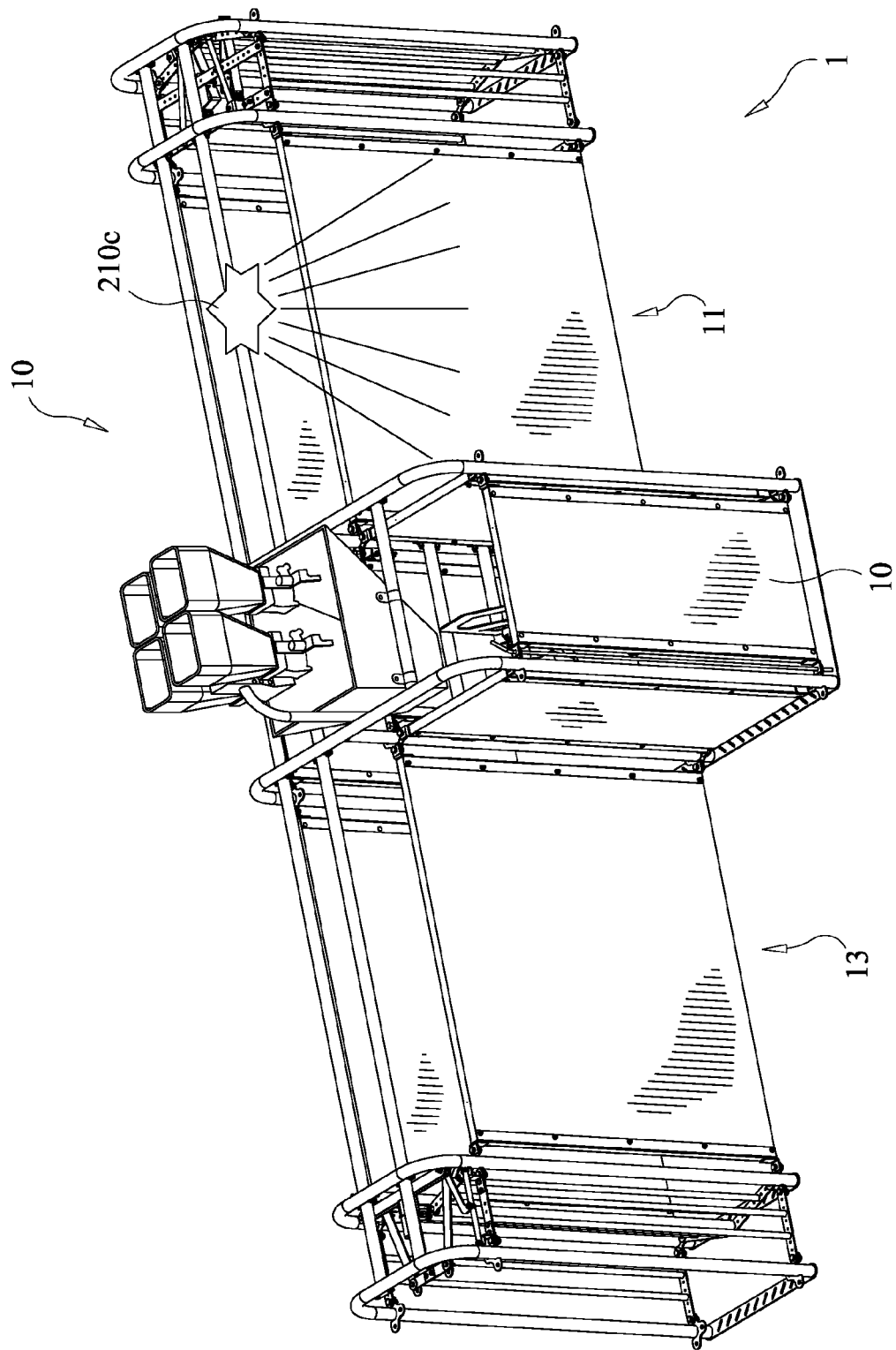

The linear layout of the Electronic Sow Feeder (ESF) assembly 10, takes advantage of a preference of swine to move in a linear direction, avoiding their tendency to balk (stop) at corners or turns. The linear pathway of a single Electronic Sow Feeder (ESF) assembly 10 is consistent with normal animal behavior patterns, thus increasing the capacity of the unit and allowing the sow to express normal behaviour. As well, in one aspect a lighting system is provided that further increases the through put capacity based on the tendency of swine to avoid dark, shadowy areas and move towards well-lit areas, as shown in FIGS. 16A-C (described below).

The width of Electronic Sow Feeder (ESF) assembly 10 between side panels 22 is selected to provide a suitable secure and non competitive environment for comfortably and efficiently feeding a sow. This width will vary depending on the sow variety and size and is selected according to principles of modern animal husbandry to provide an optimal feeding experience for a sow in a secure non competitive environment. The width is selected to prevent a sow from turning around within Electronic Sow Feeder (ESF) assembly 10. This width will vary depending on the genetics, parity, length of gestation and Body Condition Scores of sows using the system. For example, in a facility for gilts (young females), the optimum width may be less than about 20". In an operating facility for full grown sows the optimum width may be in the range of about 22" to 24". Precision Feed module 16 is located approximately midway between the entry gate module 12 and exit gate module 14, although this relative positioning can vary. The interior of Electronic Sow Feeder (ESF) assembly 10 is thus defined by an entry region 26 located on the approach side of Feed module 16 and a whiling region 28 located on the opposing second side of Feed module 16. In normal operation, a sow will stand within approach side 26 while feeding. After feeding, the sow can walk past Feed module 16 and enter into the whiling region 28, where the sow may wait before opening the gates located in the exit gate module 14, by pushing against the closed gate to leave the whiling area. Typically, approach 11 and whiling 13, regions 26 and 28 will be of similar dimensions. However, it will be seen that the overall dimensions of a single Electronic Sow Feeder (ESF) assembly 10 can vary depending on such requirements as the size of sows using the system, space available and other factors. As discussed below, a single Electronic Sow Feeder (ESF) assembly is modular in construction which permits a user to assemble the system in different configurations with, for example, the respective regions being different in length, mainly comprised of approach area 11 and whiling area 13 being different lengths and widths.

The overall height of approach area 11 and whiling area 13 is about 40", selected to prevent sows from escaping or entering Electronic Sow Feeder (ESF) assembly 10 over the side panels 22. Typically, approach area 11 and whiling area 13 have open top to permit ambient light to enter the assembly and to provide access and visibility to the sows from above.

As described below, a single Electronic Sow Feeder (ESF) assembly has a modular construction which makes it possible to configure the system and in particular feed module 16 in various configurations to meet the needs of the operator. For example, an angled configuration may be better suited to some barn retrofits or new construction, while a linear configuration, which can increase the through put capacity of the system, may be better suited in other facilities.

Figure 4:
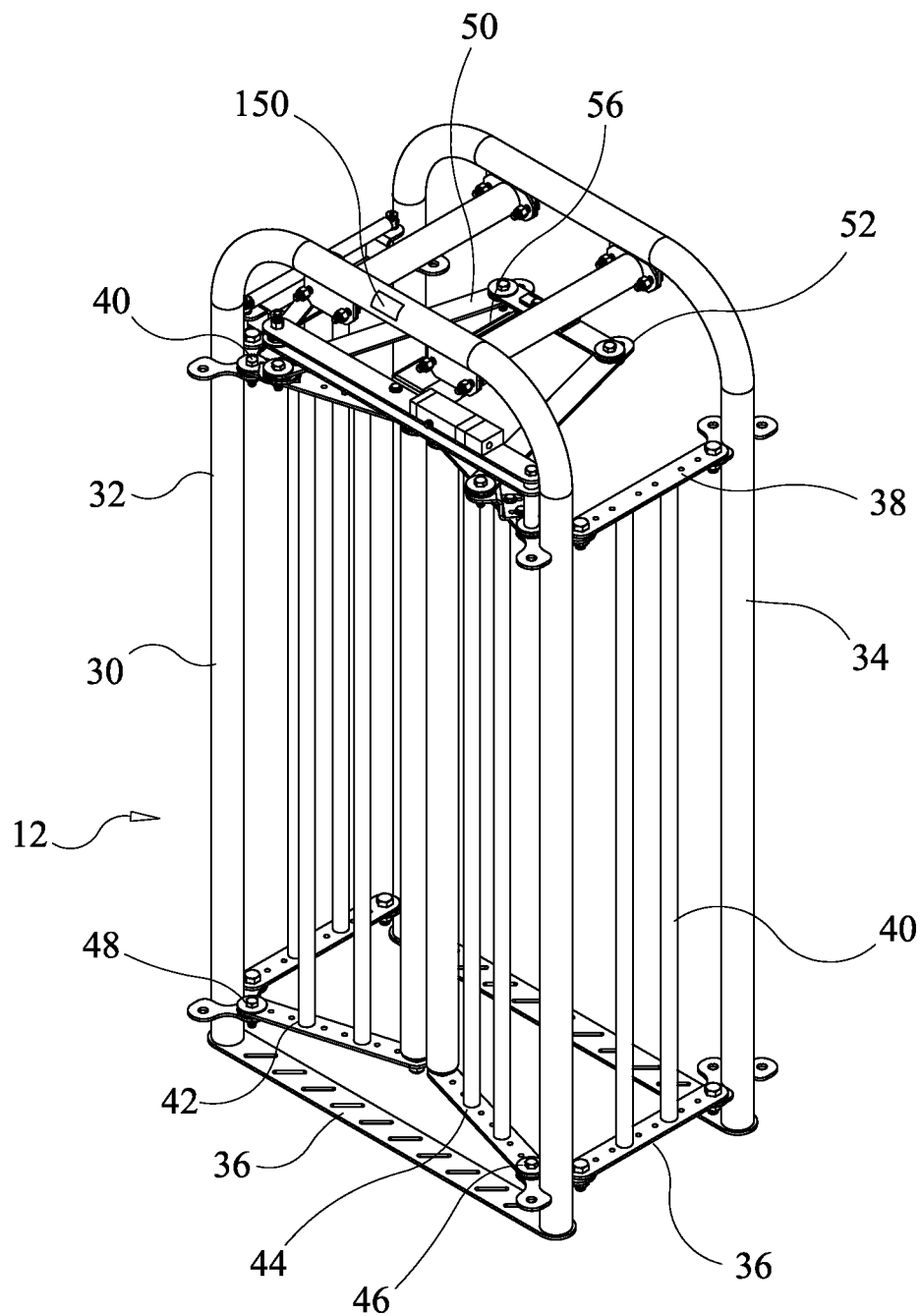
FIG. 4 is a perspective of the entry gate module portion of the device.

In one embodiment, the exit gate module 14 is located immediately adjacent to the Feed module 16 to facilitate immediate exit from the assembly. Entry gate module 12 is shown in more detail in FIGS. 4 through 6. As seen in FIG. 4, entry gate module 12 comprises a rigid frame 30 composed of a first frame member 32 having the shape of an inverted U, an opposed second frame member 34 having a similar configuration and spaced apart from frame member 32, a rectangular base 36 for supporting frame members 32 and 34, and opposed upper spacers 38 at the upper end of frame 30 joining together frame members 32 and 34. An array of posts spans base 36 and spacers 38 to retain sows within entry gate module 12. A pair of opposing gates, 42 and 44 are pivotally mounted to opposing sides of frame member 32 for opening outwardly from assembly 10 by pivot mounts 46 located at opposing upper and lower regions of first frame member 32.

Gates 42 and 44 each cover half of the opening of assembly 10 and make contact with each when closed. When the gates are in contact they angle outwardly from the interior of assembly 10 to prevent them from rotating inwardly past this position. As a result, entry gate module 12 can only open by means of gates 42 and 44 swinging outwardly and cannot be opened from the outside of the pen by a sow pushing inwardly. This prevents a sow from forcing her way into approach area 11 when the assembly is occupied by another sow and entry gate module 12 is closed.

Figure 5:
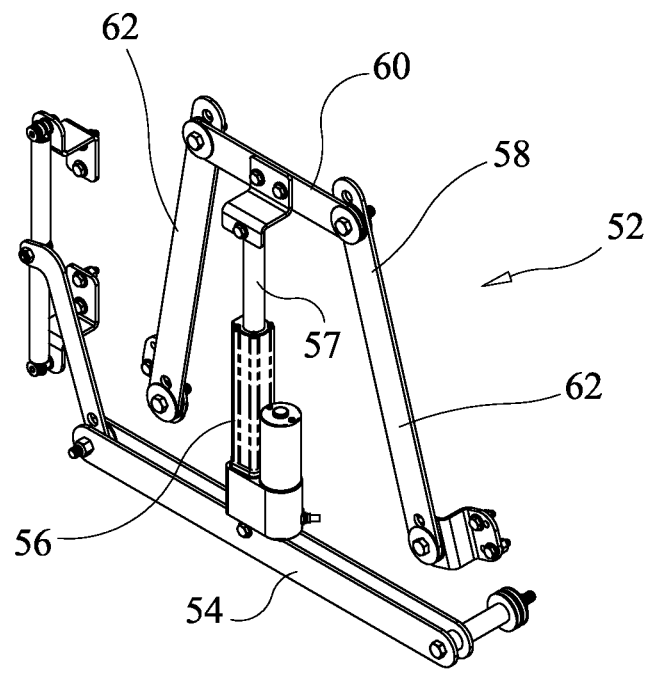
FIG. 5 is a perspective view of an electrical actuator for the entry and exit gate modules of the device, according to one aspect.

Gates 42 and 44 are rotated between open and closed positions by means of an actuator assembly 52, shown in more detail in FIG. 5. Actuator assembly 52 comprises a base 54, the opposing ends of which are secured to frame member 32. An electro-mechanical actuator member 56 is mounted to base 54. Actuator member 56 comprises a reciprocating linear actuator such as a LINAK™ or other suitable actuator such as a gear motor assembly, a solenoid, or other electric motor assembly configured to drive a shaft in a reciprocating linear direction. Actuator member 56 extends horizontally and rearwardly from base 54, as seen in FIG. 4. Actuator member 56 comprises a movable ram member 57, the free end of which is mounted to a bracket assembly 58. Bracket assembly 58 comprises a crossbar 60 and a pair of *opposing side arms 62 pivotally mounted to opposing ends of crossbar 60. The free ends of arms 62 are pivotally mounted to gates 42 and 44 respectively, whereby extension of actuator 56 opens entry gate module 12 and retraction of actuator 56 closes entry gate module 12.

Figure 6:
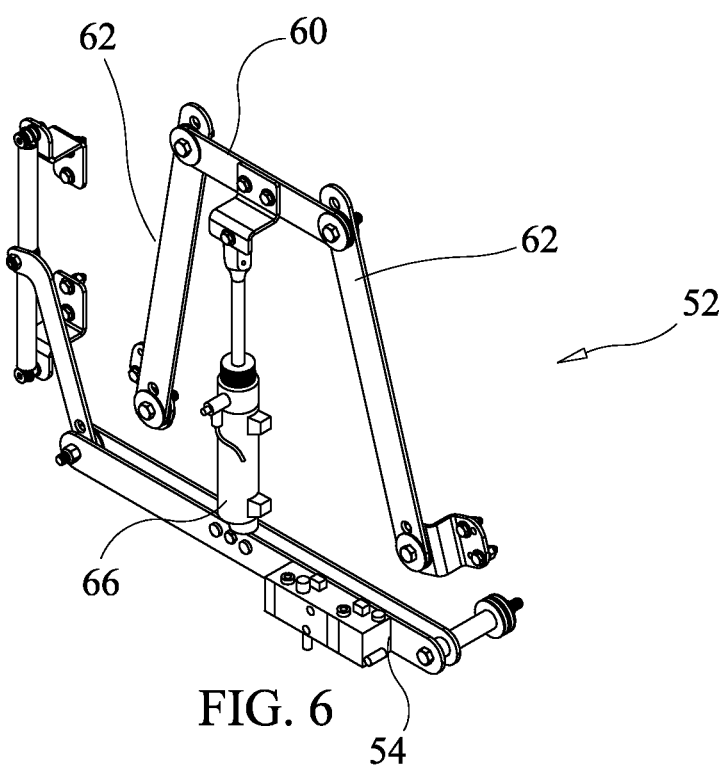
FIG. 6 is a pneumatic actuator for the entry gate module, according to a further aspect of the invention.

FIG. 6 depicts an alternative embodiment of actuator assembly 52 wherein the actuator member comprises a pneumatic or hydraulic actuator 66 in place of the electrical actuator 56 of FIG. 5. Pneumatic or hydraulic actuator 66 is conventionally driven by a pressurized fluid source, not shown.

Figure 7:
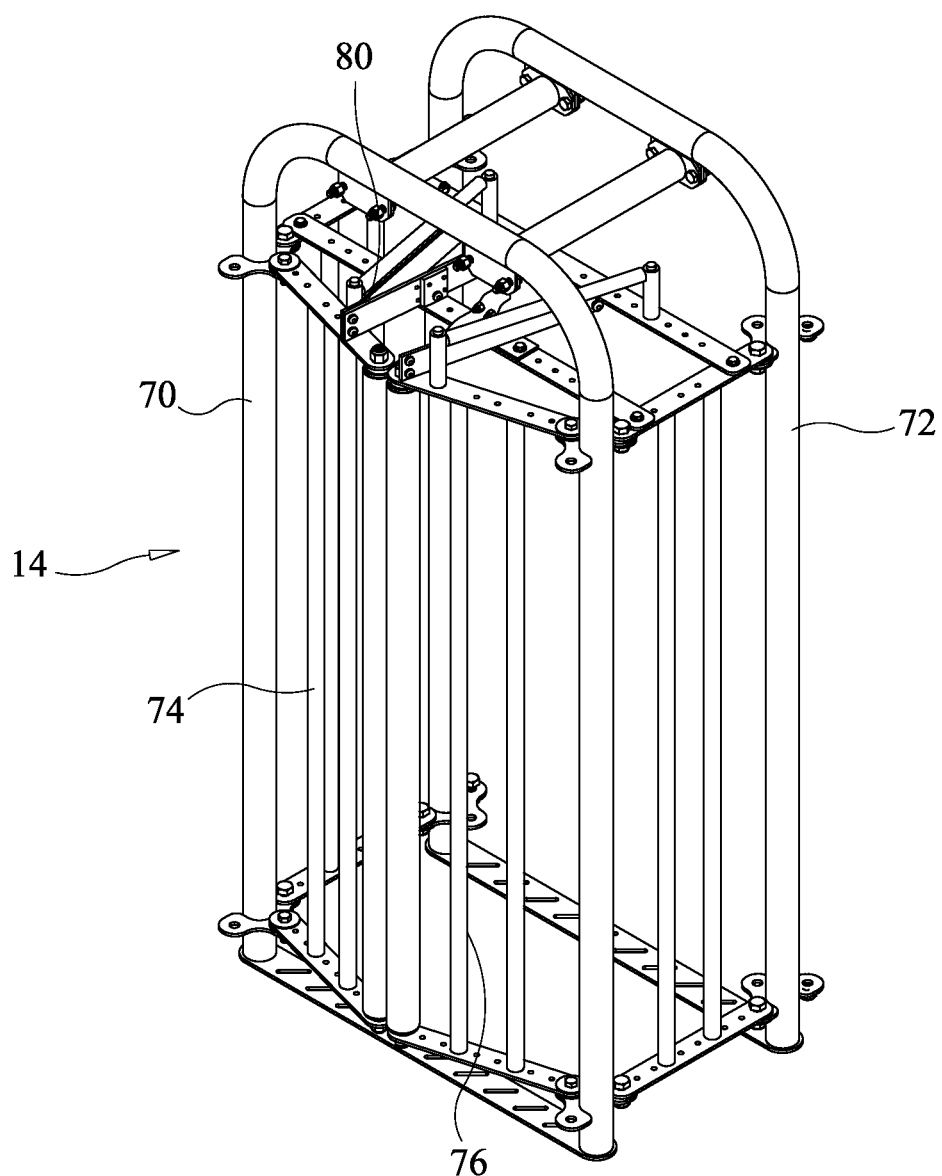
FIG. 7 is a perspective view of an exit gate module for the device.

Exit gate module 14 is shown in more detail in FIG. 7. Exit gate module 14 is generally similar in structure to entry gate module 12 and is composed of front and rear frame member 70 and 72 respectively, pivoting gates 74 and 76. Gates 74 and 76 angle outwardly from the interior of assembly when closed in a similar fashion to entry gate module 12. As a result, gates 74 and 76 are restricted from opening inwardly into the interior of assembly 10 and can only open by rotating outwardly to allow a sow located within whiling area 13 to exit the device. When exit gate module 14 is closed, a sow located outside the assembly is prevented from forcing her way into the inside of a single Electronic Sow Feeder (ESF) assembly. Gates 74 and 76 may be spring-loaded to urge the gates closed until pushed open by a sow exiting whiling area 13. Optionally, exit gate module 14 may be provided with a one-way mechanical lock that allows gate module 14 to open from the interior of whiling area 13 when gates 74 and 76 are urged outwardly by a sow inside whiling area 13 but prevent opening of gates 74 and 76 from outside the pen. This prevents a sow from entering whiling area 13 through the exit gate module 14 rather than the entry gate module 12.

Precision Feed module 16 will now be described by reference to FIGS. 8-14. Precision Feed Module 16 comprises a support frame 80 composed of a plurality of tubular members 82 having an inverted U configuration. Frame members 82 are secured to frame 20 of Electronic Sow Feeder (ESF) assembly 10 whereby precision feed module 16 is essentially an integral module within a single Electronic Sow Feeder (ESF) assembly, as seen in FIG. 1. Precision Feed module 16 comprises a feeding region 84 which is integral with the interior of a single Electronic Sow Feeder (ESF) assembly, where the sow may have access to feed portions dispensed by metered feed dispenser(s) 100 described below. Feeding region 84 is partially enclosed by front and rear panels 88 and 90, which are generally flush with panels 22 and define a channel-shaped space contiguous with the interior of Electronic Sow Feeder (ESF) assembly 10. Feed region 84 can be partially or fully blocked at its exit end by a gate at 92, which when closed blocks access to region 84 to a sow entering Electronic Sow Feeder (ESF) assembly 10 from the exit end.

Feed module 16 further comprises a feed dispensing region 86 where feed can be dispensed into a receptacle such as a trough, tub or other receptacle isolated from the sow within assembly 10 as well as sows external to assembly 10. As described below, the filled receptacle may be then moved into the feeding region 84. Feed dispenser region 86 is enclosed by panels 96 to isolate region 86 from sows located outside of the Electronic Sow Feeder (ESF) assembly 10. One of panels 96 is hinged to frame 80 to permit access by an operator.

Figure 8:
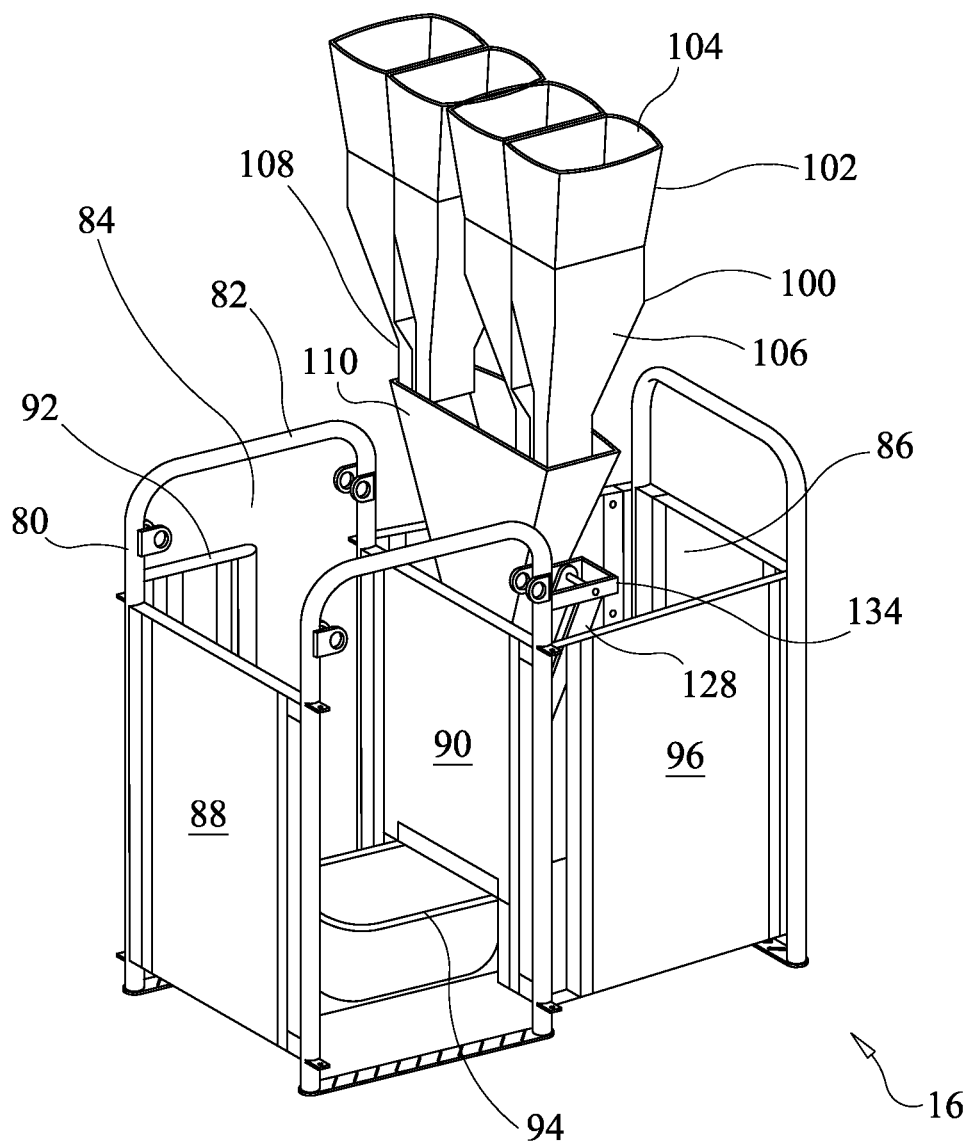
FIG. 8 is a perspective view of the precision feed module of the device.
Figure 8A:
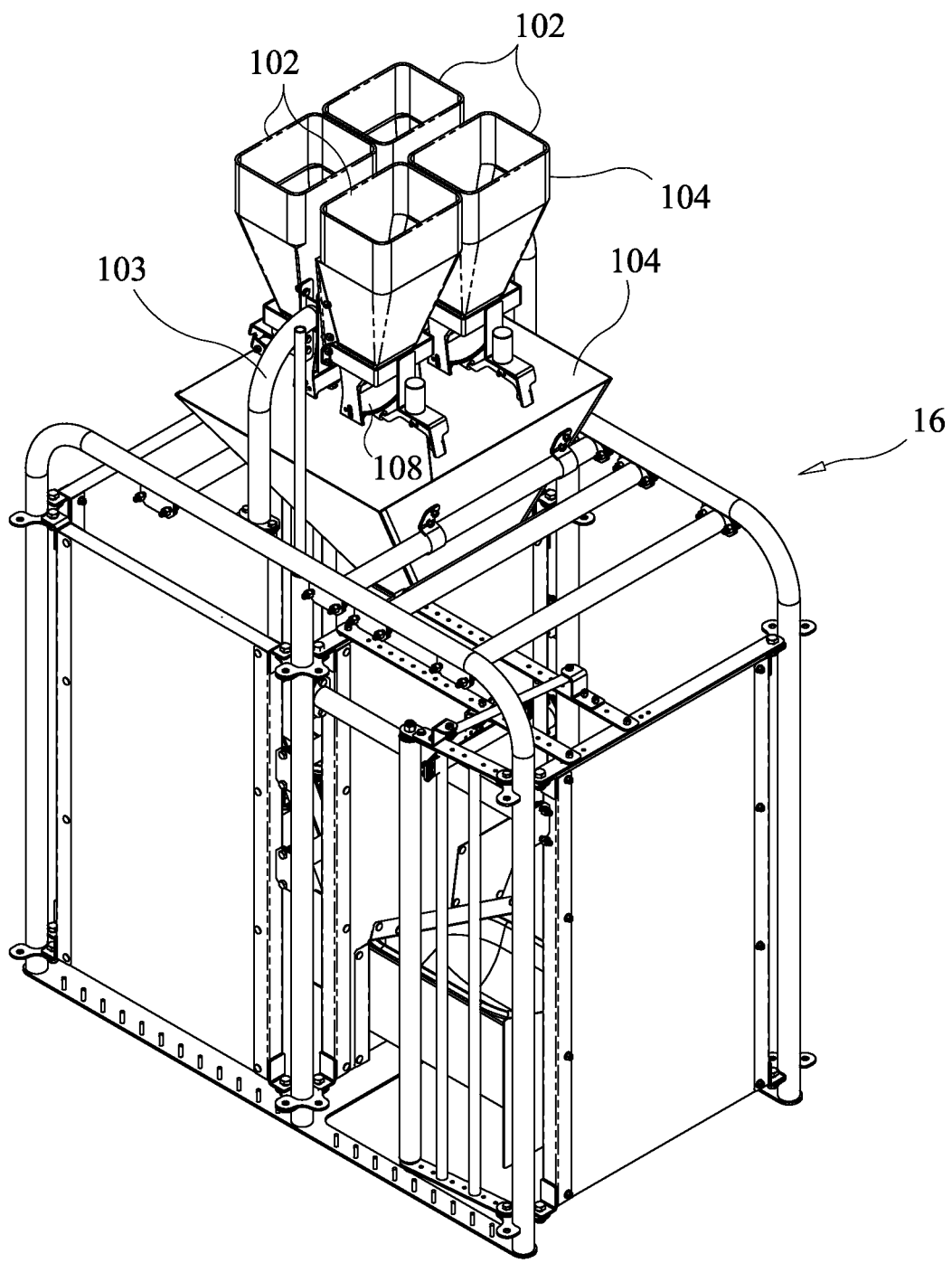
FIG. 8A is a further perspective view of the precision feed module.
Figure 8B:
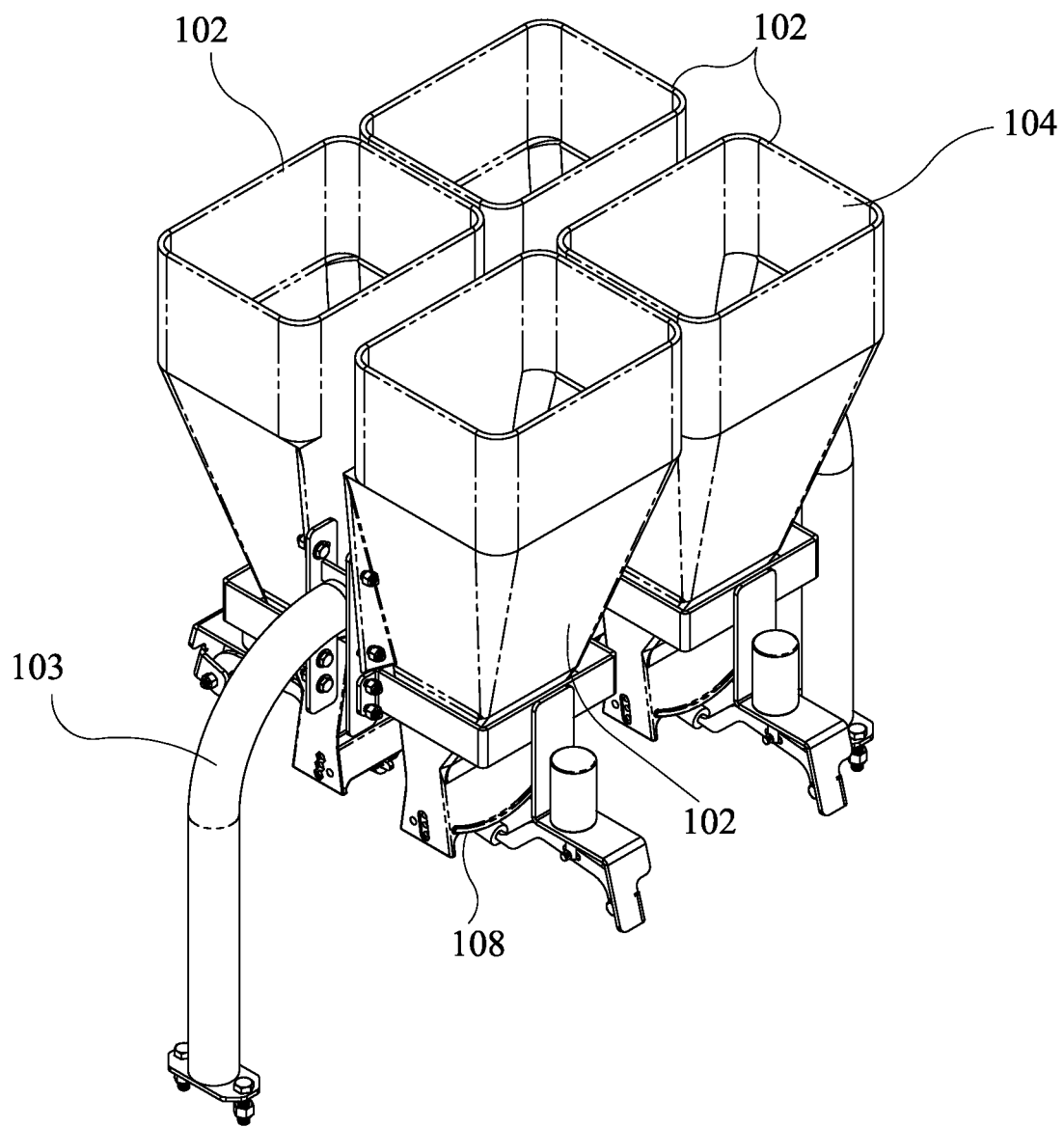
FIG. 8B is a perspective view of a portion of the precision feed module, showing the metered Feed dispenser units of the assembly.
Figure 8C:
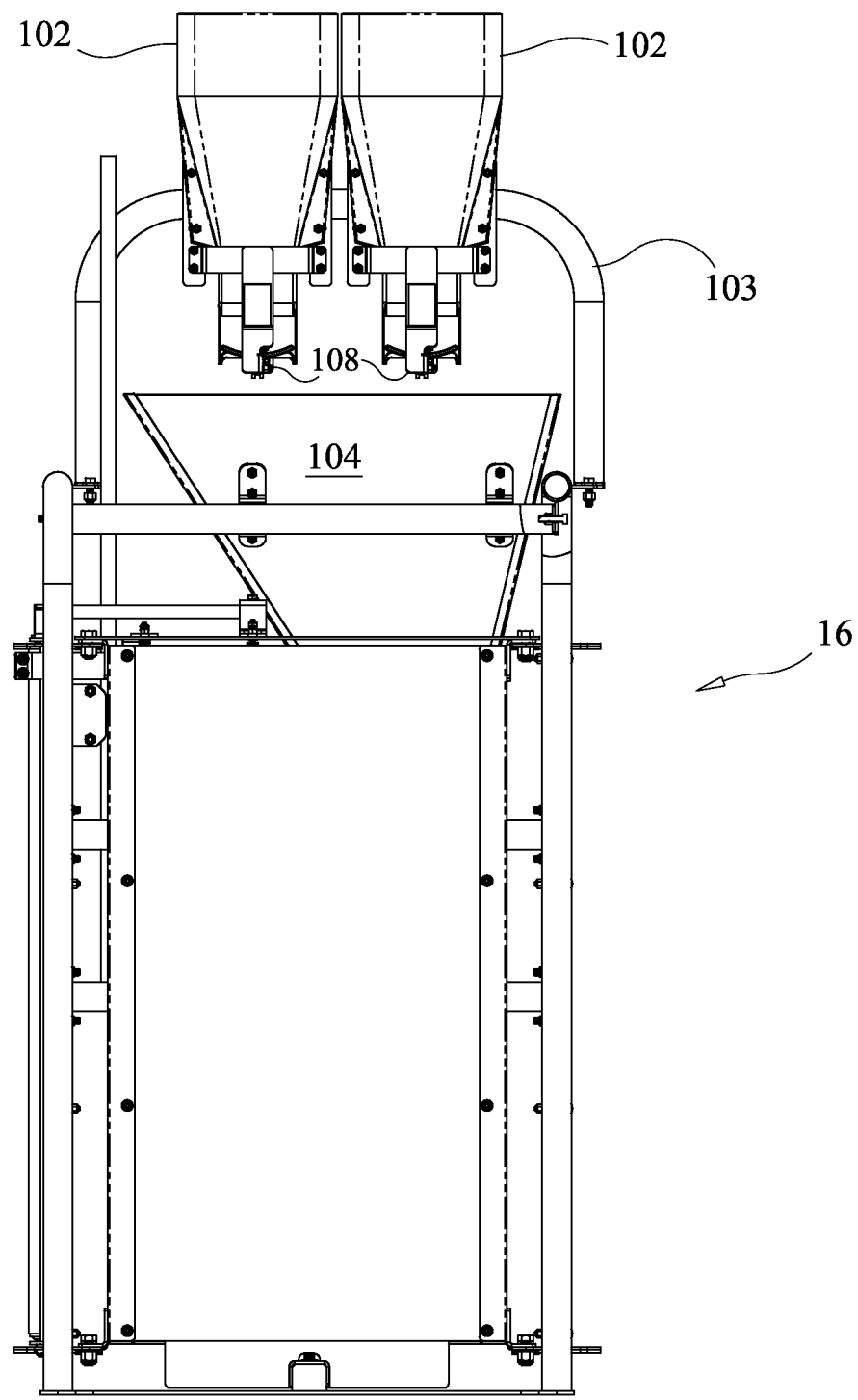
FIG. 8C is a side elevational view of the precision feed module.

Feed module 16 further comprises one or more feed metered feed dispensers 100. Metered feed dispenser 100 may be comprised of a singular or plurality of metered feed dispenser units 102. In the present example, four metered feed dispenser units 102 are provided. As seen in FIGS. 8A and 8B, units 102 are arranged in a 2×2 array wherein four metered feed dispenser units 102 are secured in pairs to a central support 103 comprising a bar having an inverted U-shaped configuration. It will be seen that the number of units 102 can vary, including use of a single metered feed dispenser unit 102. Metered feed dispenser units 102 each supply a feed or a feed component. As a result, a greater number of metered feed dispenser units provide more options and control over feed mixtures provided to the sows. In the present example, four metered feed dispenser units are provided to each dispense a feed or feed component, which may be the same or different. The feed components from metered feed dispenser units 102 can be combined when feeding the sow.

Metered feed dispenser units 102 each comprise an independently controlled metered feed dispenser as a delivery tool. Metered feed dispenser units 102 are independently controlled by a controller 200, described below, for metering a selected quantity or mixture of feed or feed ingredients to a sow in accordance with an individually calculated feed plan that is designed individually for the sows. For example, a particular sow may require a predetermined quantity of feed at a given feeding (which may vary at different times of the day) composed of a selected mixture of the four feed components dispensed by individual metered feed dispenser units 102. The precise quantity and feed mixture for each sow may be predetermined by an automatic calculation process. The feeding plan can be based on selected criteria such as sow weight, age, pregnancy state, gestation length, past performance, Body Condition Score, Back fat levels, genetic potential management input and others Each sow can be individually identified, for example by scanning a bar code or RFID chip secured to the sow. As described below, the sow is identified upon entry into a single Electronic Sow Feeder (ESF) assembly 10 whereupon controller 200 actuates the dispensing of a calculated mixture and quantity of feed into the receptacle. As described below, controller 200 may integrate with sow management software such as the PigChamp™ system to calculate the individual feed plans for the sows.

Figure 11:
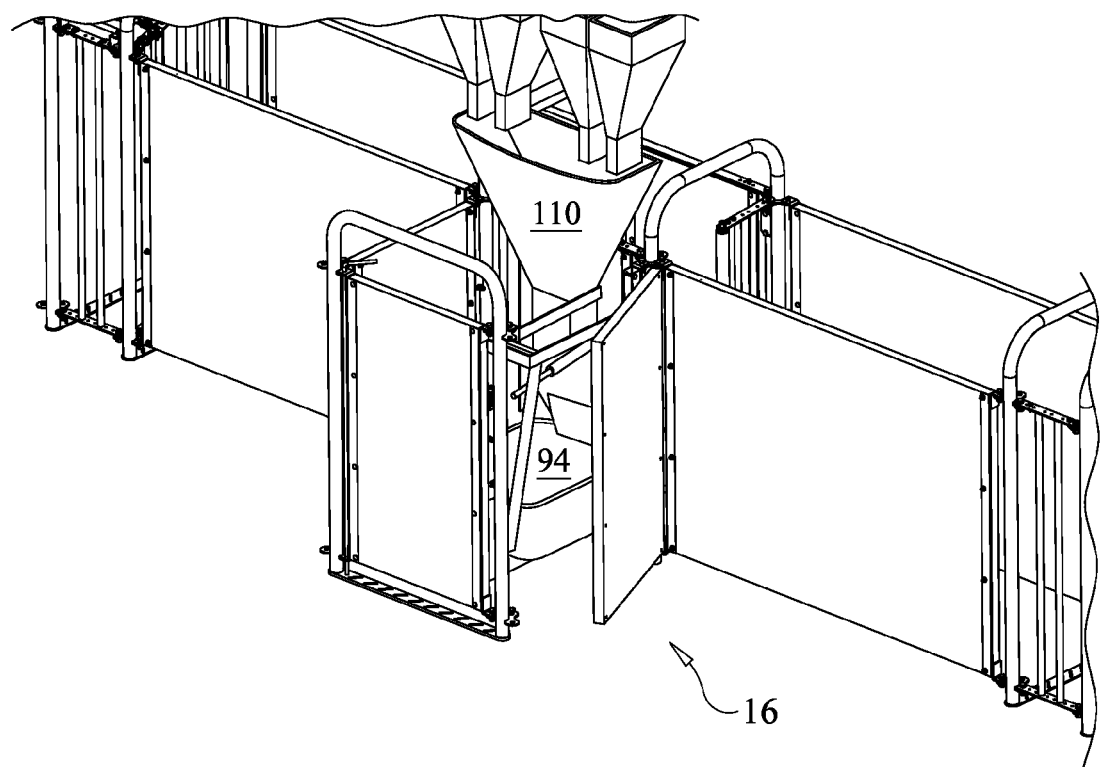
FIG. 11 is a perspective view of the Electronic Sow Feeder (ESF) assembly, with the precision feed module gate partially opened to show the interior of the precision feed module.

Each metered feed dispenser unit 102 comprises an inlet hopper 104 having an open top for filling with feed or a feed ingredient, a metered feed dispenser housing 106 and an electrically-actuated metered feed dispenser mechanism, not shown, located within housing 106 for dispensing a calculated portion and quantity of feed or a feed from hopper 104 in response to a controller, as described below. Feed discharged from metered feed dispenser unit 102 is discharged via outlet 108 into a funnel 110 located beneath metered feed dispenser units 102. Funnel 110 has a relatively wide mouth for receiving outlets 108 from all of metered feed dispenser units 102. Hopper 110 discharges feed into outlet chute 112, as seen in FIG. 11. Discharge chute 112 is positioned to open into receptacle 94 when this is in the retracted or extended position.

A water dispenser, not shown, dispenses a selected quantity of water into receptacle 94 to provide a predetermined amount of water to the sow through an outlet or nozzle, not shown. The water dispenser is supplied with water from a source of pressurized water with the flow being controlled by a valve which is under the control of the controller.

Figure 9:
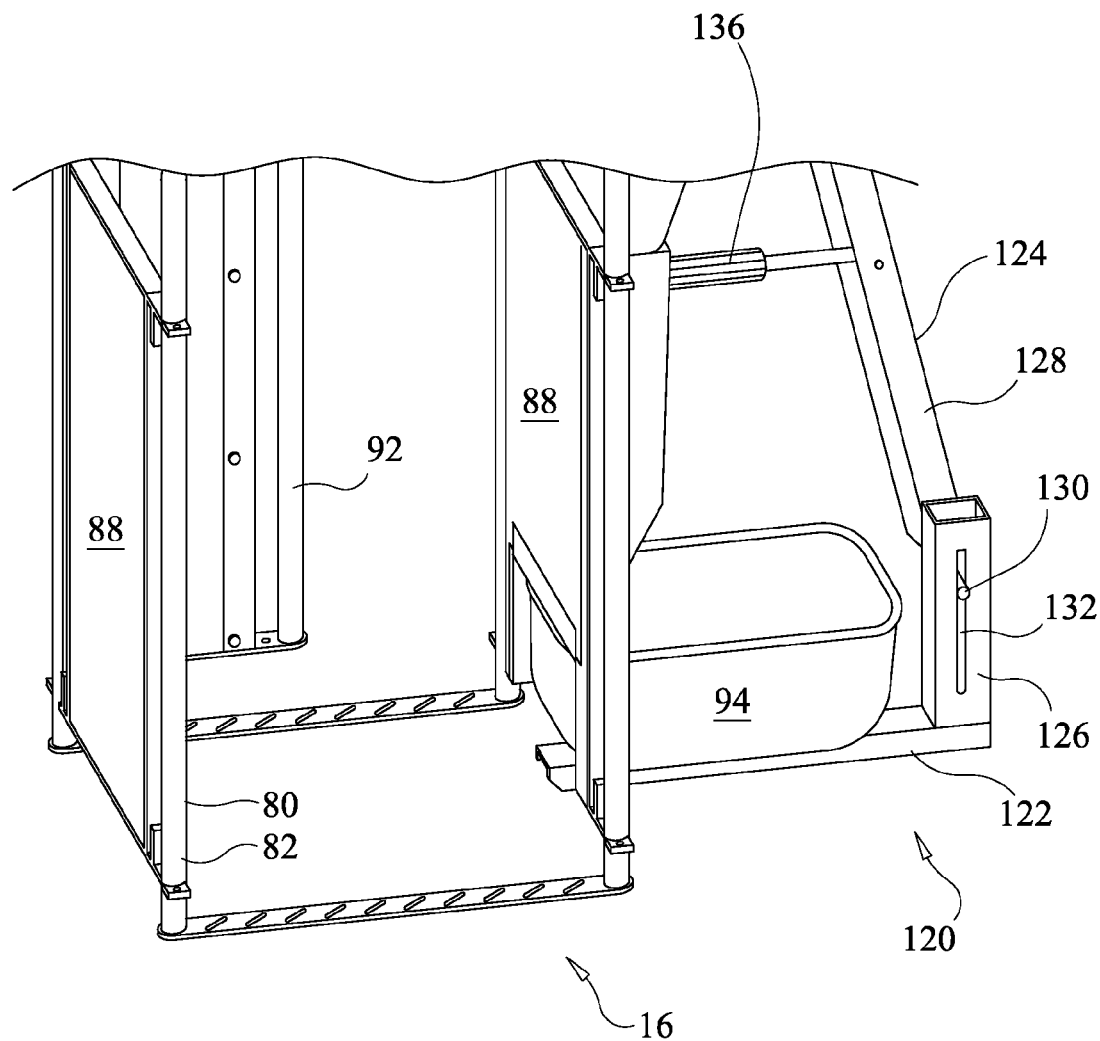
FIG. 9 is a perspective view showing a portion of the precision feed module, with the food receptacle in a retracted position.
Figure 10:
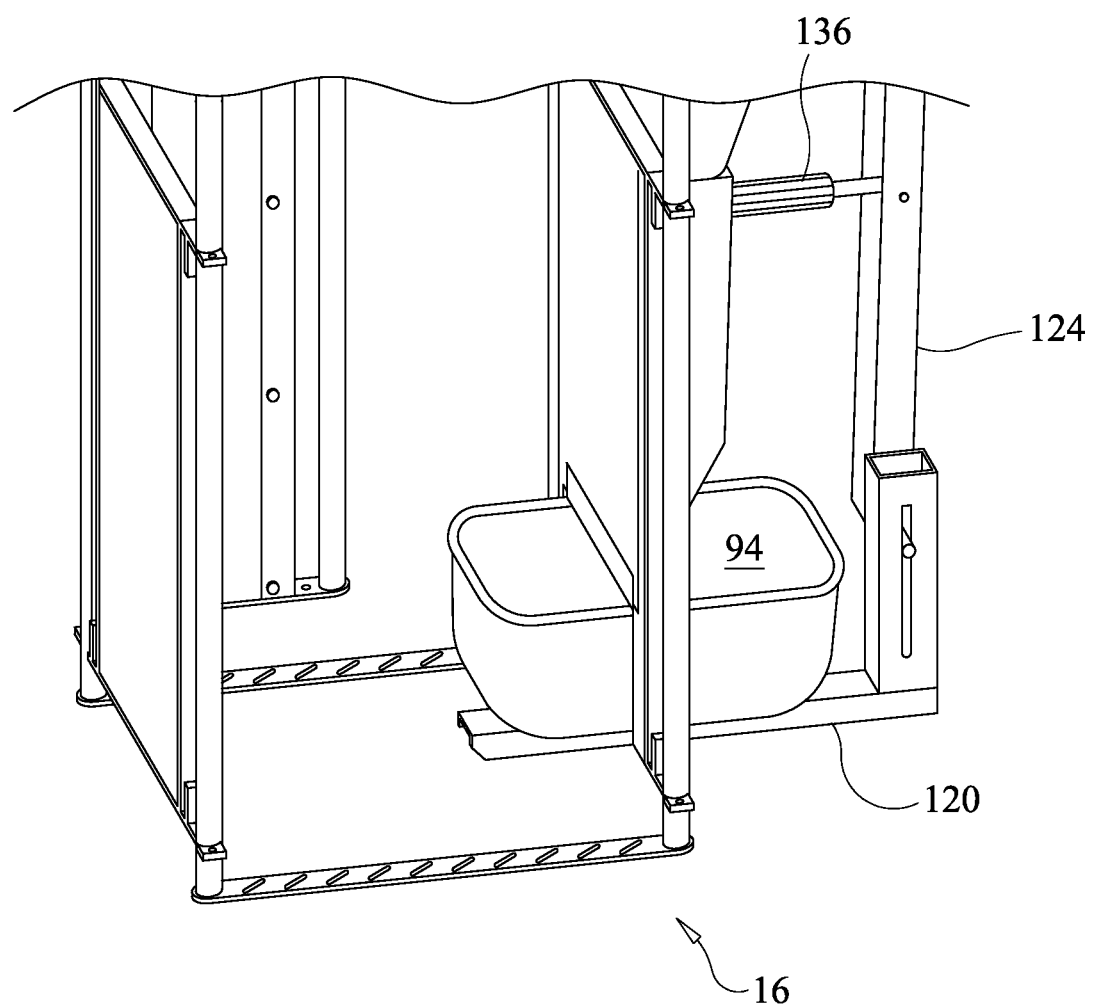
FIG. 10 is a perspective view as in FIG. 9, showing the feed receptacle in a partially retracted position.
Figure 14:
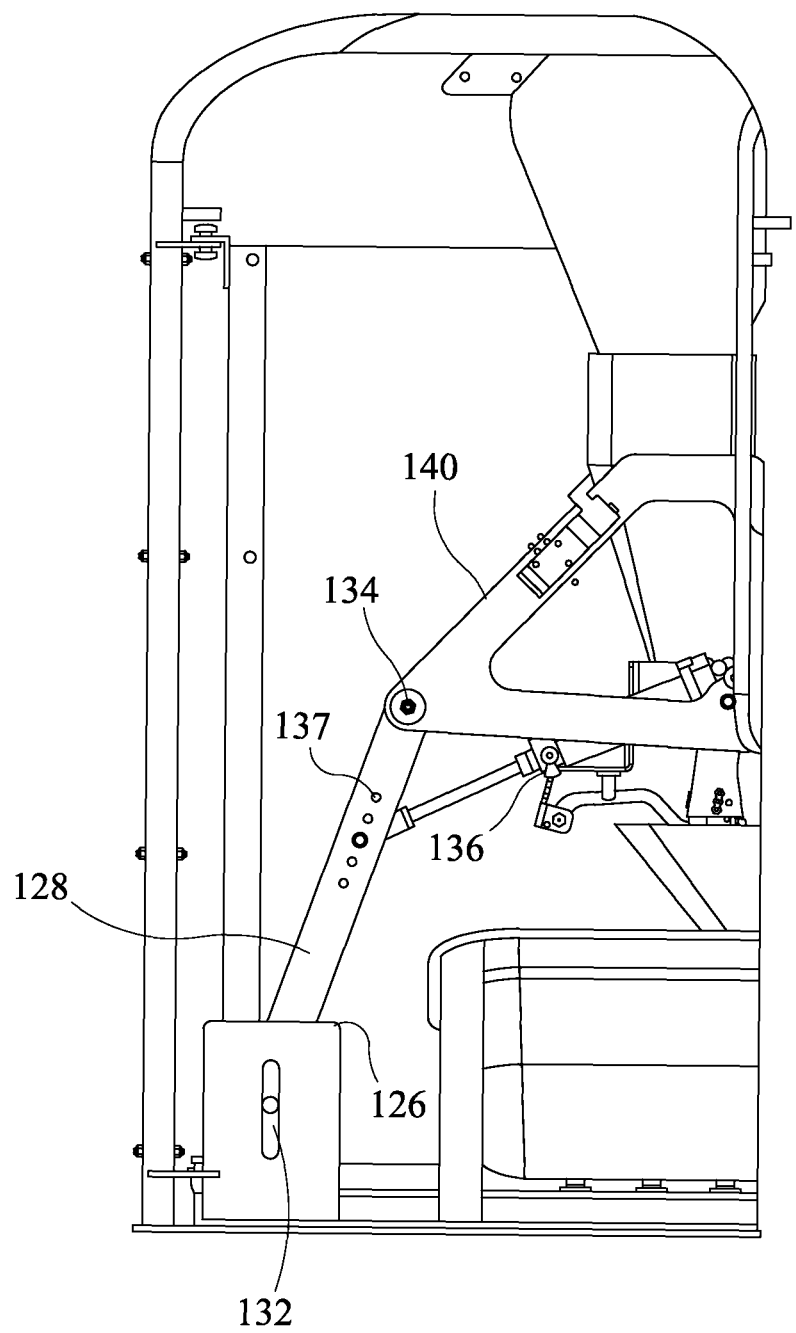
FIG. 14 is a side elevational view of a portion of the precision feeding module showing the feed receptacle in a retracted position.

Precision Feed Module 16 further comprises a reciprocating assembly 120, as seen in more detail in FIGS. 9, 10 and 14, for carrying receptacle 94. Assembly 120 comprises a support 122 for supporting receptacle 94. Support 122 comprises an essentially horizontal platform configured to retain the receptacle, such as a prong or a pair of spaced apart prongs that fit a receptacle. Support 122 can be supported on the floor by members such as rollers (such as wheels or bearings) or glide shoes (not shown) for gliding on the floor in a reciprocating linear pathway. Support 122 is engaged to a pivoting linkage assembly 124 which urges support 122 for reciprocation between an extended and a retracted position when actuated. Linkage assembly 124 includes a post 126 that extends upwardly from support 122 and a rotatable arm 128. Arm 128 engages post 126 by means of a peg 130 extending horizontally from arm 128 which travels within a vertical slot 132 in post 126. Rotational movement of arm 128 is thus translated into horizontal movement of base 122. As shown in FIG. 14, the upper end of arm 128 is pivotally mounted to frame 80 by means of a mounting bracket 140 that protrudes outwardly from frame 80, which supports a pivot mount 134 for pivotally engaging arm 128, as seen in FIG. 8. A linear actuator 136 is joined to arm 128 and frame 80 whereby linear extension or retraction thereof causes arm 128 to rotate in a selected direction. Actuator 136 is pivotally attached to arm 126 in one of an array of openings 137 for varying the distance travelled by support 122 upon actuation of actuator 136. Retraction of actuator 136 thus extends support 122 into the interior of space 84 of Precision feed module 16 to position receptacle 94 for access by a feeding sow. Extension of actuator 136 retracts support 122 from Precision feed module 16, thereby removing receptacle 94 from the interior of the space 84 for inaccessibility by the sow and in a position for refilling by metered Feed dispenser 100. Actuator 136 is under the control of a central controller, described below.

FIG. 8 shows assembly 120 in an extended position. FIG. 9 shows assembly 120 in a fully retracted position and FIG. 10 shows reciprocating support 120 in a partially retracted position intermediate between the fully extended and fully retracted positions. When assembly 120 is fully extended, support 120 and receptacle 94 are located in a blocking position in the interior of a single Electronic Sow Feeder (ESF) assembly 10. In this position, the interior space of a single Electronic Sow Feeder (ESF) assembly 10 is effectively divided by the support 120 and receptacle 94 whereby the space comprises an approach area 11/feeding region in which the sow may stand while feeding and whiling area 13 where the sow may stand to await discharge from assembly 10.

Figure 12:
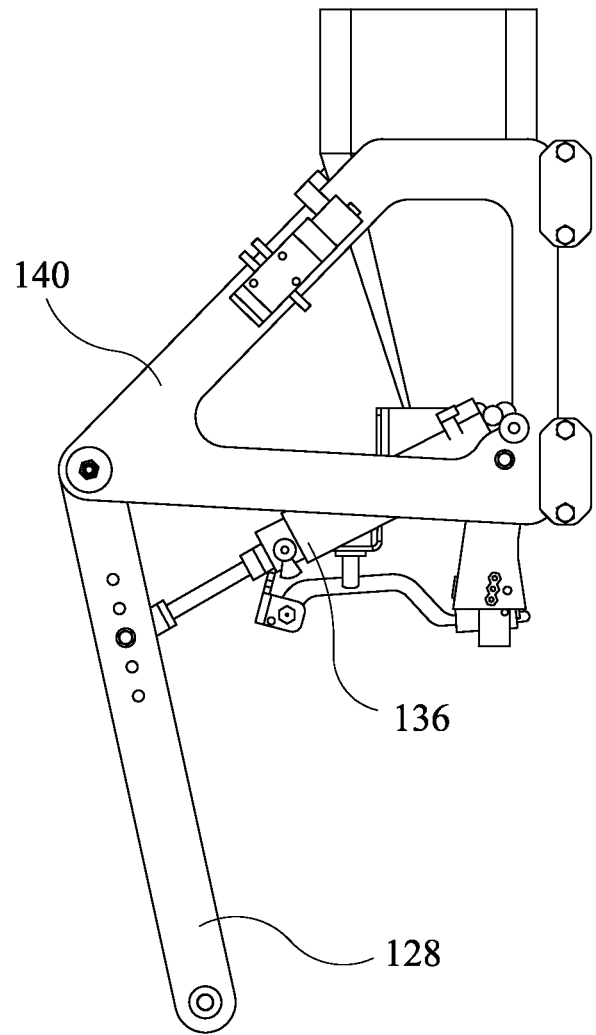
FIG. 12 is a plan view of the actuator assembly for a precision feed module, according to one aspect wherein the actuator is pneumatic.
Figure 13:
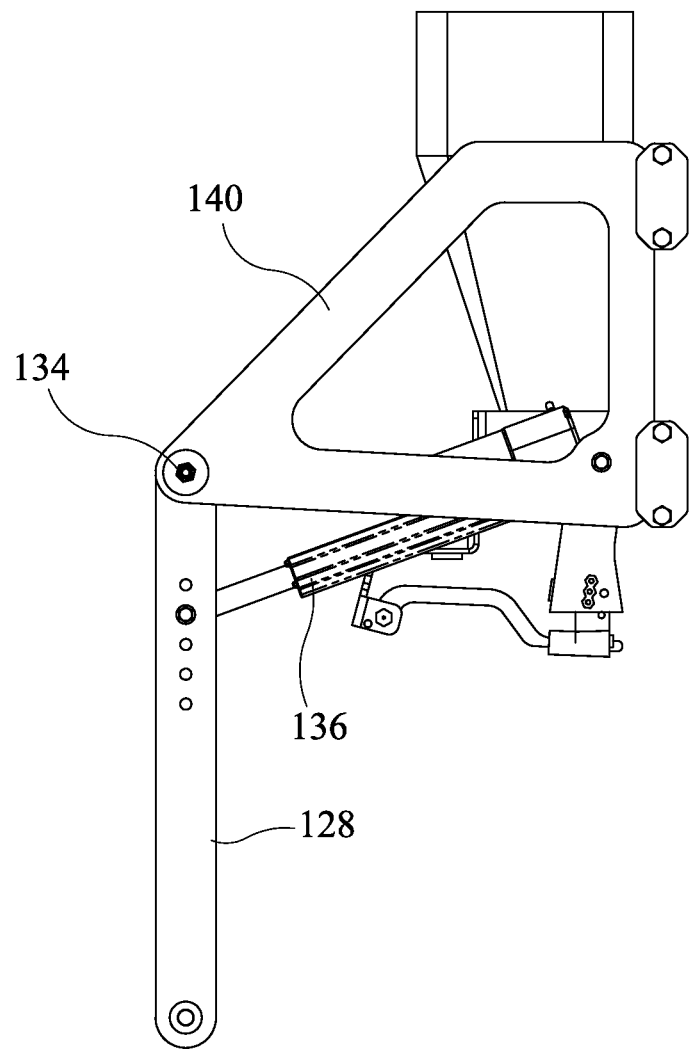
FIG. 13 is an elevational view similar to FIG. 12, showing a further embodiment in which the actuator is electrical.

FIGS. 12 and 13 provide further detail of linear actuator 136 and rotatable arm 128, wherein FIG. 12 shows a first embodiment having a pneumatic or hydraulic actuator and FIG. 13 shows a second embodiment wherein actuator 136 comprises an electrical or electro-mechanical actuator. Arm 128 is pivotally mounted to a bracket 140, which in turn is mounted to frame 80. Bracket 140 extends outwardly from frame 80 in order to position arm 128 sufficiently outwardly therefrom to accommodate actuator 136. Actuator 136 is pivotally mounted at a first end to bracket 140 at a position adjacent to frame 80 and at a second end to arm 128. It will be seen that in FIGS. 12 and 13 the extendable ram portion of actuator 136 is mounted to arm 128. However, this configuration may be reversed whereby the base of actuator 136 is pivotally mounted to arm 128 and the extendable ram portion being mounted to bracket 140. The pneumatic actuator 136 of FIG. 12 is operatively configured to a source of hydraulic fluid, not shown.

A single Electronic Sow Feeder (ESF) assembly 10 is modular in its construction whereby entry gate module 12, exit gate module 14 and Feed module 16 each comprise an individual module. Assembly of a single Electronic Sow Feeder (ESF) assembly thus involves assembling these components into the complete system. The user may design a single Electronic Sow Feeder (ESF) assembly, in various configurations depending on the sizes of these modules that are selected. For example, approach area 11 and whiling area 13 may be the same length or different. As well, a single Electronic Sow Feeder (ESF) assembly may be angled by providing any one of the above modules with an angled end portion for attaching at an angle to an adjacent module. As mentioned above, an angled configuration may be desirable for certain applications such meeting space requirements in the facility.

The presence or absence of a sow within A single Electronic Sow Feeder (ESF) assembly 10 is detected by an electric eye or other motion sensor 150 (see FIGS. 1-4). Motion sensor 150 is located within approach area 11, for example about 12" from entrance gate module 12. Motion sensor 150 is positioned to detect a sow at any or most positions within approach area 11 for example in an overhead position angling downwardly and rearwardly towards exit gate module 14.

Figure 15A:
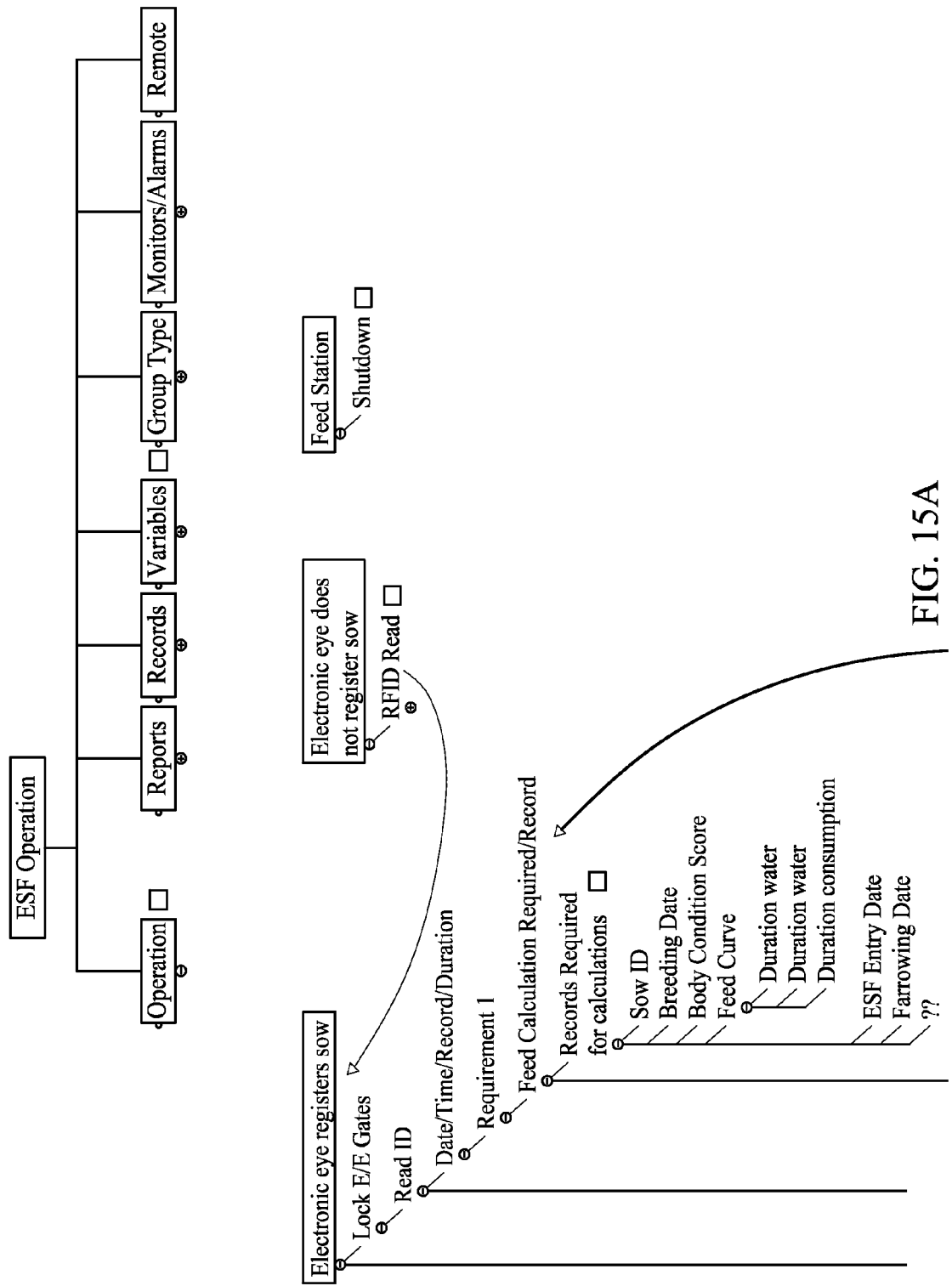
FIGS. 15A and 15B depict a flow chart showing operation of one aspect or segment of the control system the control system.
Figure 15B:
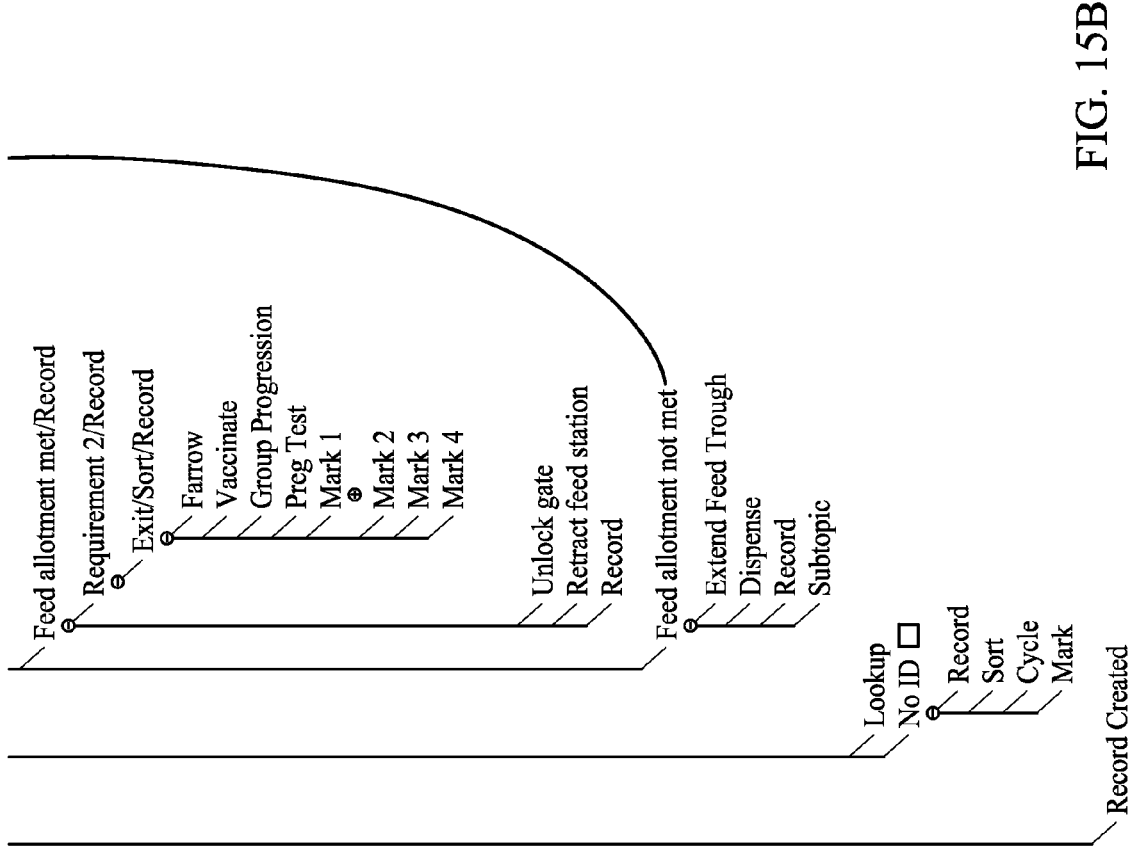

Operation of the system is controlled by a control system 200, which is shown schematically in FIG. 1. The operation of control system 200 is depicted in FIGS. 15A-B. The control system may comprise a general purpose computer which is operatively connected to the actuators described herein and feed metered feed dispenser units 102, for example by wireless communication as depicted in FIG. 1. For operation of the system, each sow is provided with an individual identification number, which may be encoded on an RFID chip, scanable bar code or other information carrier which is secured to the sow based on parameters known to the operator. A calculated feed mixture and quantity is individually determined for each sow, based on known criteria. Each sow may be provided with an individually calculated "feeding plan" which can vary the quantity and/or feed mixture over time, for example based on time of day, weight and age of the sow The feed plan can be based on selected criteria such as sow weight, age, pregnancy state, gestation length, past performance, Body Condition Score, Back fat levels, genetic potential management input and others and other criteria, or which may provide a non-varying mixture and/or quantity. A reader is provided which identifies the sow and transmits the sow identity information to control system 200. The reader may comprise a hand-held mobile device or it may be located in a fixed position for detecting the sow identification information as a sow approaches or enters a single Electronic Sow Feeder (ESF) assembly, The control system 200 comprises Central Processor and data storage (CP) wherein the feeding requirements of each sow have been entered as well as other information concerning the sow which correlates to a feeding requirement. Such information may include pregnancy state, vaccination state, weight, back fat measurements, sow temperature, ambient room temperature, farrowing state, or other parameters. The controller provides signals for performing the following functions:

- Calculating and Generating a feed plan for each individual sow by correlating identification of a sow with a predetermined mixture and quantity of feed and calculating a feed plan for the sows based on selected criteria that are entered into the control system for each sow such as sow weight, age, pregnancy state, gestation length, past performance, Body Condition Score, Back fat levels, genetic potential management input and others;
- Opening and closing the entry gate module 12 and to allow each sow to remain in A single Electronic Sow Feeder (ESF) assembly 10 for a predetermined duration;
- Dispensing a meal consisting of a calculated quantity and mixture of feed into receptacle 94 selected for an individual sow, in graduated portions over a predetermined length of time by individually controlling metered feed dispenser units 102 to generate the selected mixture and quantity for the individual meal;
- Positioning receptacle 94 within the interior of assembly 10 during feeding of the sow, and retracting receptacle 94 during a non-feeding period;
- Timing the duration of each feeding and drinking episode for an individual sow and it may record this information;
- Generating reports and updating stored records, in real time or at a predetermined intervals, providing information respecting feeding information and consumption, animal feeding status and other information;
- Actuating an on-site and/or remote alarm in the event of system malfunction or other selected alarm trigger; and
- Actuating a staged lighting array wherein lights are actuated sequentially from entry to exit to encourage a sow to enter into and then move through a single Electronic Sow Feeder (ESF) assembly. The staged sequence may comprise initially turning on lights within the approach area n of a single Electronic Sow Feeder (ESF) assembly, followed by sequentially activating lights deeper within assembly 10 while de-activating lights after a predetermined interval that allows the sow sufficient time to move through the system.

Figure 17:
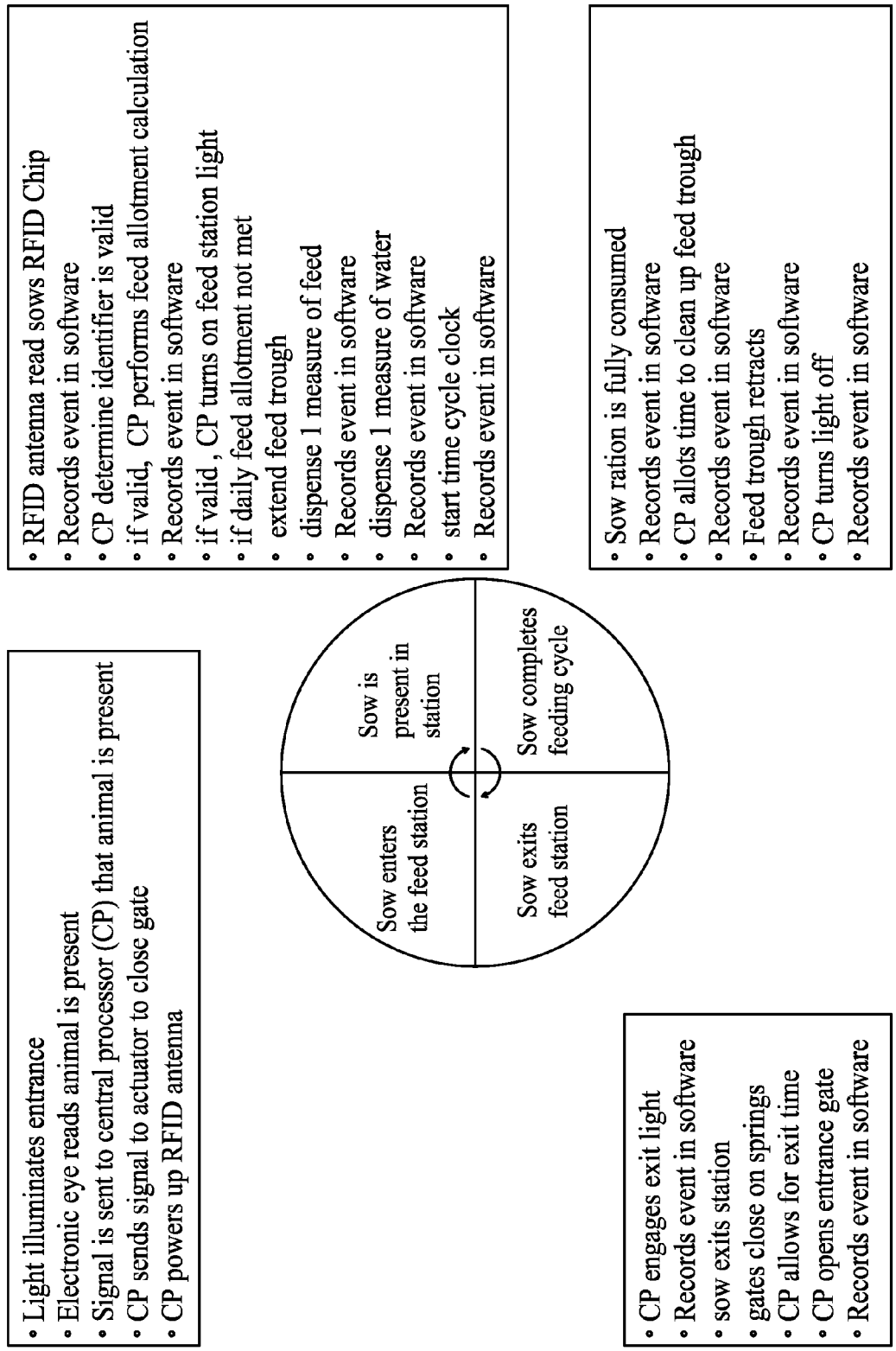
FIG. 17 is a diagram showing operation of the system.

As seen in FIG. 17, Control system 200 may integrate with sow management software such as the PigChamp™ system for determining an optimal feed plan for each sow. For this purpose, the sow management software is either downloaded into control system 200 or optionally control system 200 may interact with a remote computer host in a "cloud" based data communication configuration.

As shown in FIG. 17, assembly 10 may operate according to the following sequence:

- illuminate assembly 11, thereby attracting a sow to enter assembly 11;
- detecting the presence of a sow within assembly 11 with an electric eye or other proximity sensor, and communicating this information to control system 200;
- control system 200 actuates gate module 12 to close and optionally powers up an RFID antenna (if the stand-by position is unpowered)
- detecting individual sow data with the RFID antenna, from an RFID secured to the sow, such as an ear tag.
- Recording the initial sow information in the controller 200
- Determining a feed allotment for the sow, based on predetermined factors for the sow, within the controller 200
- If the feed allotment includes dispensing additional feed to the sow, dispensing a mixture and quantity of feed and water into the feed trough, located on a carrier, under the control of controller 200 and actuating the carrier to position the filled trough within feed module 16 for access by the sow
- illuminating feed module 16 and turning off the illumination of assembly 11
- recording the feed/watering event in controller 200 and initiating a timer wherein the sow is provided with a predetermine duration for consuming the feed and water
- recording the consumption event in controller 200
- retracting the trough and recording in controller 200
- turning off illumination of feed module 16 and illuminating whiling assembly 13
- opening exit gate module 14 to allow sow to exit, followed by closing of gate after a sow exits, as determined by proximity sensor
- opening entry gate module 12 for a subsequent sow.

Control system 200 is connected to a user interface either wirelessly or via a wired connection. The user interface may comprise a mobile computing device (not shown) such as a Smartphone, PDA, tablet computer or the like or other mobile or non-mobile platform to allow the user to remotely or non-remotely operate the system and/or enter information respecting sows. For this purpose, the mobile device may be programmed with an application ("app") that facilitates remote operation and information gathering/entering. The user interface permits data entry into the control system 200, including feeding information for individual sow and other control information. The user interface may comprise a handheld remote unit, and may be performed by a mobile device such as a smart phone, PDA, or tablet computer. Controller 200 is programmed to seamlessly integrate sow management software such as PigChamp™ with the host program, wherein the operator need not be aware of the transition from operating software, (the calculation of operating functions as determined by fixed data points inputted by the operator), to swine herd management software. Thus, the operator is not normally required to export or input data in the form of table, data set, or as prescribed by other swine herd management systems. The operator need not be aware of the transition as each section of the program seamlessly interacts leaving the operator with a seamless or uninterrupted experience At the initiation of a feeding episode, entry gate module 12 is open and a sow can enter a single Electronic Sow Feeder (ESF) assembly, at will. Entry gate module 12 is then closed to prevent other sows from entering. The identity of the sow may be automatically detected at this point and this information relayed to the controller 200. Control system 200 then calculates and determines the feed mixture and quantity that should be fed to the sow, based on stored and/or calculated information for the sow. Metered feed dispenser 100 may then dispense the first portion of selected mixture and quantity of feed into receptacle 94 which is then urged into space 84 for access by the sow. The sow may be permitted to consume the feed for a predetermined duration or alternatively may be permitted to feed at will, in which case the duration of feeding is measured and recorded. Feed and water are dispensed in calculated portions over a predetermined period of time until the sow is no longer detected at the Feed (normally, after the sow has exited from the single Electronic Sow Feeder (ESF) assembly 10) or the daily ration has been consumed, clean up time has expired and the feed receptacle has retracted in Precision Feed Module 16. After feeding, the sow exits past the blocking gate 92, and leaves the unit through exit gate module 14, following which exit gate module 14 closes. Entry gate module 12 may then open to permit another sow to enter.

FIGS. 16A-C depicts a lighting system according to one aspect of the invention. According to this aspect, a single Electronic Sow Feeder (ESF) assembly, 10 is provided with three overhead lights 211, 213 and 210c. Lights 210 are mounted in an overhead position to frame 20. Lights 210 provide a light intensity that is selected to encourage sows to move towards the respective light source. A first light 211 is located adjacent to the entry gate module 12 of A single Electronic Sow Feeder (ESF) assembly 10; a second light 213 is located at the Precision Feed module 16 and a third light 210c is located adjacent to exit gate module 14. Lights 210 are controlled by control system 200 whereby in operation, light 211 is illuminated when it is desired to attract a sow into a single Electronic Sow Feeder (ESF) assembly. At this point, lights 213 and c are dark. Light 211 can then be switched off and light 213 switched on to encourage the sow to move to the Precision Feed module 16. When it is then desired to encourage the sow to move towards the whiling area 13, light 210c can be switched on and lights 211 and b switched off. Finally, when it is desired for the sow to exit, all of lights 211-c can be switched off.

The scope of the invention should not be limited by the preferred embodiments set forth in the examples, but should be given the broadest interpretation consistent with the description as a whole. The claims are not to be limited to the preferred or exemplified embodiments of the invention.

The invention claimed is:

1. A modular system for individually feeding sows comprising:
    an entry module comprising an entry gate for selectively admitting an individual sow into the entry module;
    an exit module comprising an exit gate for selectively permitting the individual sow to leave the exit module, the exit module configured to provide a whiling area to isolate the individual sow after feeding; and
    a feeder module comprising an openable and closable barrier configured to selectively block access by the individual sow to the exit module from the feeder module, the feeder module further comprising a feed dispenser for dispensing a selected quantity of feed into a trough, the feeder module further comprising a reciprocating assembly for displacing the trough between an extended position wherein the trough is positioned within the feeder module to permit access by the individual sow and a retracted position wherein the trough is outside the feeder module to be inaccessible to the individual sow, wherein the feed dispenser is configured to dispense feed into the trough when the trough is outside the feeder station, said reciprocating assembly comprising a reciprocating drive arm configured to engage the trough and to displace the trough in a linear path between the extended and retracted positions, an actuator engaged to the drive arm adapted to reciprocate said drive arm between the extended and retracted positions in response to a control signal from a controller and rollers or glide shoes for supporting the trough on an underlying surface whereby the trough can be displaced along the surface;
    wherein the entry module, feeder module and exit module are configured to be joined together to form a snuggery for isolating the individual sow.

2. The system of claim 1 wherein said entry module, feeder module, and exit module are aligned in an essentially straight linear pathway with the feeder module being located between the entry and exit modules.

3. The system of claim 1 wherein the feed dispenser comprises a plurality of feed dispenser units each being independently controlled for dispensing a selected quantity of feed into said trough, wherein each of the sows may be provided with a predetermined mixture and/or quantity of feed.

4. The system of claim 3 further comprising a controller in operative communication with said feed dispenser units, comprising data processing and storage components for calculating and storing feed plans for each of the sows and for controlling said feed dispenser units to dispense said selected quantity of feed into the trough, wherein said selected quantity of feed comprises a predetermined feed mixture for each of the sows based on a stored or daily calculated feed plan.

5. The system of claim 4 wherein said controller comprises a remote computing device.

6. The system of claim 4 wherein said controller comprises an interface for integrating swine management software with said controller for determining individual feeding plans.

7. The system of claim 4 wherein the controller is in operative communication with the entry gate, the exit gate and the barrier, wherein the controller is configured to allow the individual sow to remain within the feeder module for a predetermined duration.

8. The system of claim 4 wherein the controller is configured whereby the selected quantity of feed is dispensed to the individual sow in graduated portions over a predetermined length of time.

9. The system of claim 1 wherein the extended position of the trough blocks access to the exit module to prevent the individual sow from entering the exit module from the entry module.

10. The system of claim 1 further comprising a lighting system under control of a controller, wherein said lighting system comprises an array of lamps configured to sequentially illuminate discrete portions of the system, wherein a level of illumination and an illumination sequence encourage the individual sow to progressively move through the system.

11. The system of claim 10 further comprising at least one proximity sensor, wherein the location of the individual sow within the snuggery is determined by said at least one proximity sensor, and said controller actuates said lights to sequentially illuminate the entry area module, the feeder module and the whiling area of said snuggery in response to proximity of said individual sow to the proximity sensor.

12. The system of claim 10 wherein said sequential illumination is controlled by a timer.

13. The system of claim 1, wherein said drive arm is adjustably attached to the actuator whereby a travel distance of the trough may be varied.

14. The system of claim 1, wherein the drive arm engages the trough through a linkage assembly, the linkage assembly comprising an upstanding post engaged to a support for the trough, the post comprising a slot for engaging a pin protruding from the drive arm, whereby rotational movement of the drive arm is translated into horizontal linear movement of the trough support for displacement of the trough along said linear path.

\* \* \* \* \*